United States Patent
Nishida et al.

(10) Patent No.: US 7,470,730 B2
(45) Date of Patent: Dec. 30, 2008

(54) INK-JET INK COMPOSITION FOR COLOR FILTER, PRODUCTION METHOD FOR INK COMPOSITION, AND PRODUCTION METHOD FOR COLOR FILTER

(75) Inventors: Tomonori Nishida, Tokyo (JP); Masashi Nishiyama, Tokyo (JP); Koji Sato, Chita Gun (JP); Shun Saito, Chita Gun (JP); Chihiro Imase, Chita Gun (JP)

(73) Assignees: Dai Nippon Printing Co., Ltd., Tokyo-to (JP); NOF Corporation, Tokyo (JP)

(*) Notice: Subject to any disclaimer, the term of this patent is extended or adjusted under 35 U.S.C. 154(b) by 408 days.

(21) Appl. No.: 10/167,897

(22) Filed: Jun. 12, 2002

(65) Prior Publication Data
US 2004/0048950 A1 Mar. 11, 2004

(30) Foreign Application Priority Data
Jun. 15, 2001 (JP) ............................... 2001-182566
Jun. 6, 2002 (JP) ............................... 2002-166359

(51) Int. Cl.
*C09D 11/00* (2006.01)

(52) U.S. Cl. .................. 523/160; 523/161; 523/400; 523/406

(58) Field of Classification Search ................ 523/160, 523/161, 400, 406; 106/31.6, 31.85; 524/558, 524/366, 556
See application file for complete search history.

(56) References Cited

U.S. PATENT DOCUMENTS

| | | | |
|---|---|---|---|
| 5,922,401 A | 7/1999 | Kashiwazaki et al. | |
| 6,084,006 A | 7/2000 | Kashiwazaki et al. | |
| 6,111,044 A * | 8/2000 | Yamamoto et al. | 526/266 |
| 6,627,364 B2 * | 9/2003 | Kiguchi et al. | 430/7 |
| 2003/0193624 A1 * | 10/2003 | Kobayashi et al. | 349/42 |

FOREIGN PATENT DOCUMENTS

| | | |
|---|---|---|
| EP | 0451738 | 10/1991 |
| EP | 1048700 | 11/2000 |
| JP | 59075205 | 4/1984 |
| JP | 11-202144 | 7/1999 |
| JP | 11-246544 | 9/1999 |
| JP | 2000-284112 | 10/2000 |
| JP | 2001-066418 | 3/2001 |
| JP | 2001091732 A * | 4/2001 |
| JP | 2001350012 A * | 12/2001 |

OTHER PUBLICATIONS

Machine Translation of JP 2001-350012 A (2001).*
Machine Translation of JP 2001-091732 A (2001).*
Lewis Sr., Richard J.; Hawley's Condensed Chemical Dictionary 13th Edition, John Wiley & Sons, New York, 1997 (p. 376).*

* cited by examiner

*Primary Examiner*—Edward J Cain
(74) *Attorney, Agent, or Firm*—Ladas & Parry LLP

(57) ABSTRACT

An ink-jet ink composition for a color filter of the present invention comprises; (A) an epoxy compound having two or more epoxy groups, and (B) a carboxyl group block compound having two or more functional groups represented by the formula 1a or 1b,

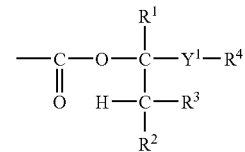

Formula 1(a)

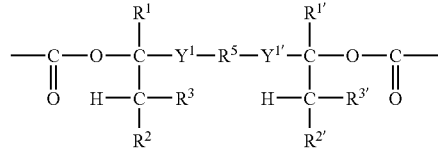

Formula 1(b)

wherein $R^1$, $R^2$, $R^3$, $R^{1'}$, $R^{2'}$ and $R^{3'}$ each denote a hydrogen or an organic group having 1-18 carbon atoms, $R^4$ and $R^5$ each denote an organic group having 1-18 carbon atoms, $Y^1$ and $Y^{1'}$ each denote an oxygen or a sulfur. $R^3$ and $R^4$ may be bonded with each other. The present invention further discloses a production method for the above-mentioned ink composition, and a production method for a color filter using the above-mentioned ink composition.

24 Claims, 7 Drawing Sheets

INK-JET INK COMPOSITION FOR COLOR FILTER, PRODUCTION METHOD FOR INK COMPOSITION, AND PRODUCTION METHOD FOR COLOR FILTER

CROSS REFERENCE TO RELATED APPLICATION

This application claims the priority of Japanese patent application Serial No. 2001-182566 filed on Jun. 15, 2001 and Japanese patent application Serial No. 2002-166359 filed on Jun. 6, 2002.

BACKGROUND OF THE INVENTION

1. Field of the Invention

The present invention relates to an ink-jet thermosetting ink composition used for forming a cured layer of a predetermined pattern, such as a coloring layer (ex., a pixel part) on a substrate of a color filter, a production method for the ink-jet thermosetting ink composition, and a method for producing a color filter using the ink-jet thermosetting ink composition.

2. Description of the Related Art

Recently, with development of personal computers, in particular, development of portable personal computers, demand for a liquid crystal display, particularly for a color liquid crystal display device has been increased. However, since the color liquid crystal display device is expensive, cost reduction is more and more required, in particular, cost reduction for a color filter, whose proportion in the cost is high, is highly requested.

In general, as shown in FIG. 1, a color liquid crystal device (101) has a structure including a color filter 1 and an electrode substrate 2 such as a TFT substrate facing with each other with a gap part 3 of about 1 to 10 μm therebetween filled with a liquid crystal compound L and the circumference thereof sealed by a sealing material 4. The color filter 1 has a structure with a black matrix layer 6 formed in a predetermined pattern for blocking the light an the boundary part between the pixels, a pixel part 7 with a plurality of colors (in general, the three primary colors of the light including red (R), green (G) and blue (B)) for forming the pixels arranged by a predetermined order, a protect layer 8, and a transparent electrode layer 9 laminated in this order on a transparent substrate 5 from the side closer to the transparent substrate. Moreover, an orientation layer 10 is provided on each inner surface side of the color filter 1 and the electrode, substrate 2 facing therewith. Furthermore, pearls 11 with a certain particle size are dispersed in the gap part 3 as the spacer for maintaining the cell gap between the color filter 1 and the electrode substrate 2 constantly and evenly. By controlling the light transmissivity of the liquid crystal layer on the rear side of the pixels colored in each color or on the rear side of the color filter, the liquid crystal layer can be operated as a shutter so as to obtain a color image.

In the case fine particle-like pearls 11 as shown in FIG. 1 are dispersed as the spacer, the pearls are dispersed randomly regardless of whether they are provided on the rear side of the black matrix layer 6 or on the rear side of the pixels. In the case the pearls are disposed in the display area, that is, in the pixel part, the backlighting light transmits in the pearl part, and furthermore, the display image quality is deteriorated significantly due to the disturbance of the liquid crystal orientation in the vicinity of the pearls. Then, as shown in FIG. 2, instead of dispersing the pearls, pillar-like spacers 12 having a height corresponding to the cell gap can be formed in an area on the inner surface side of the color filter, the area being superimposed with the position at which the black matrix layer 6 is formed.

In FIG. 2, a color liquid device 102 is provided.

Detail portions of the color filter such as the pixel part, the pillar-like spacers, the protect layer or the like can be provided by forming a coating layer of a predetermined pattern using a resin, drying and solidifying the coating layer, and further as needed curing by the cross-linking reaction.

To the resin layer comprising the details, not only a performance to a certain degree is required in terms of the common physical properties as a layer such as the adhesion property, the evenness of the layer thickness, the strength, the hardness and the heat resistance which does not cause thermal shrinkage or decrease of the layer thickness in the color filter production process, but also a particularly high performance is required in terms of the characteristics regarded important specifically for each detail part. For example, to the resin layer as the pixel part whose optical characteristics regarded important, it is required to have the excellent characteristics particularly in terms of the pattern shape accuracy, the evenness of the layer thickness, the transparency, the coloring property and the discoloration resistance. To the resin layer as the black matrix layer, it is required to have the excellent characteristics particularly in terms of the pattern shape accuracy and the light shielding property. To the resin layer as the pillar-like spacer for maintaining the cell gap, it is required to have particularly the excellent strength and the excellent size stability even in the case of forming in a relatively large thickness. Moreover, to the resin layer as the protect layer 8 covering the pixel part, sufficient hardness and sufficient adhesion property are required for protecting the pixel part, the excellent transparency and the layer thickness evenness are required so as to avoid an adverse effect to the color of the pixels, and furthermore, the non-pollution properties, such as the passivation property capable of inhibiting transfer of the polluting substance from the coloring layer side to the liquid crystal and the non-elution property without the risk of eluting the protect layer itself to the liquid crystal, are required so as not to pollute the liquid crystal compound sealed in the gap part 3. Furthermore, to the protect layer 8, a sufficient solvent resistance so as not to be dissolved or swelled at the time of coating an orientation layer forming coating liquid thereon, and sufficient hot (or warm) pure water resistance and solvent resistance are required so as not to generate thickness reduction or fall-off at the time of washing with hot pure water or an IPA (isopropanol).

Conventionally, as a method for forming a protect layer for a color filter, a method of coating, on a surface to be coated, a coating liquid containing a photo-setting type resin such as an UV curing type and an ionizing radiation type, drying and carrying out selective exposure and development by a photolithography process, or a method of coating, on a surface to be coated, a coating liquid containing a thermosetting type resin by printing or the like in a predetermined pattern, drying and heating the obtained coating layer so as to form a cured resin layer with a predetermined pattern as the details of the color filter, are well known.

Moreover, as a method for forming the pixel part of the color filter, for example, a dying method can be presented. In the case of using the dying method, first a layer of a water-soluble polymer material as a dying material is formed on a glass substrate, patterning the same in a desired shape by a photolithography process, and soaking the obtained pattern in a dying bath so as to obtain a colored pattern. By repeating the operation for three times, R, G and B color filter layers can be formed.

Moreover, as another method, a pigment dispersing method can be presented. According to the method, first a photosensitive resin layer with a pigment dispersed therein is formed on a substrate and it is subjected to patterning by a photolithography process, and a single color pattern is obtained. Furthermore, by repeating the same operation for three times, R, G and B color filter layers can be formed.

As still another method, an electro-deposition method, a method of dispersing a pigment in a thermosetting type resin, printing three times for R, G and B, and thermally setting the resin, or the like can be presented.

In the case of using the photo-setting type resin, a cured resin layer of a desired pattern can be formed on a desired position of a surface to be coated by exposing the coating layer in a desired pattern, however, there is a risk of pollution leading to the display failure by transfer of the low molecular weight components existing essentially in the coating liquid such as a monomer, a photo polymerization initiator or the like into the liquid crystal.

In contrast, in the case of using the thermosetting type resin, although the risk of pollution by the transfer of the low molecular weight components to the liquid crystal is low compared with the case of the UV curing type resin, it is difficult to form in a complicated pattern compared with the case of the photo-setting type resin.

Moreover, in the case of forming the pixel part, the same process should be repeated for three times in either method for forming the pixels for the R, G and B three colors, and thus a problem of cost increase and a problem of decline of the yield due to the repetition of the same process, are involved.

As a production method for a color filter capable of solving the problems, a method of forming a coloring layer (pixel part) by shooting an ink onto the substrate surface by the ink-jet method has been proposed (the official gazette of the Japanese Patent Application Laid-Open No. S59-75205).

In order to form the pixels by shooting the ink according to an accurate pattern by the ink-jet method, sustainability and straightness are required at the time of the ejecting operation from the recording head. However, in the case where the evaporation rate of the ink is too high, the ink viscosity is increased drastically at the nozzle end of the recording head so as to exhibit multiple elections of the ink droplets ("deflection of shooting direction" in other word), or choking is generated in the case of intermittent ejection with a time interval so as to disable the re-ejection, Furthermore, as shown in FIG. 3, in the case where the ink is wetly spread on the peripheral surface 13a of an orifice of the head 13, the ink droplet 14 ejected in the front direction Vx is pulled in the ink spreading direction Vy so as to exhibit multiple ejections. Therefore, due to the wetly spreading of the ink on the peripheral surface of the orifice, straightness of drop direction is further deteriorated.

Moreover, in the case where the drying rate is too high at the time of shooting a colored ink onto the substrate by the ink-jet method, the ink layer surface is solidified in the waved state or the inclined state immediately after the ejection so that the leveling is insufficient. In contrast, in the case where the drying rate is too low, it can hardly be dried completely by a heating process or even in the case where it can be dried, the efficiency is poor. Therefore, in consideration of only the ejection performance, an ink hardly dried can be used, however, in order to completely dry the ink layer, an appropriate drying property is needed as well.

As a coloring agent contained in the pixels or the black matrix of the color filter, pigments are used frequently. However, in the case where the pigment dispersing property of the color filter ink is poor, choking is generated at the nozzle part of the recording head due to aggregation of the pigment particles with each other. Therefore, in the case of using the pigment as the coloring agent, the pigment dispersing property casts the influence on the ink ejection performance.

According to the official gazette of the Japanese Patent Application Laid-Open No. H11-202144, an ink for a filter containing 60% by weight or more of a solvent with a 150° C. to 250° C. boiling point and at least one selected from the group consisting of a glycerol, a diethylene glycol and an ethylene glycol as the wetting agent, is disclosed. Since the wetting agent is provided in the ink disclosed in the official gazette, the ink can hardly be dried at the nozzle end of the recording head so that choking can hardly be generated.

Moreover, according to the official gazette of the Japanese Patent Application Laid-Open No. 2000-310706, an ink-jet method type resin composition for the color filter, which contains a coloring agent, a binder resin and a solvent with a 250° C. or higher boiling point at an ordinary pressure, is disclosed. Since a high boiling point solvent is used in the ink-jet method type resin composition for the color filter disclosed in the official gazette, the ink can hardly be dried at the nozzle end of the recording head so that choking can hardly be generated.

However, after ejection of the inks disclosed in the above official gazettes onto the substrate, the wetting agent and the high boiling point solvent, which can hardly be dried, remains to the final process in the process of drying the ink layer so that they can hardly be dried completely.

Moreover, in the case of forming the details of the color filter with a thermosetting type resin, it is common to utilize polymerization and/or the cross-linking reaction of the acid component and the epoxy component. In order to improve the strength, the hardness, the passivation property or the like of the cured resin layer, it is preferable to make the cross-linking density of the cured resin layer larger. In order to increase the cross-linking density of the epoxy-based thermosetting type resin layer, it is preferable to increase the reaction point concentrations (or reaction site concentrations) of the acid component and the epoxy component in the coating liquid or the coating layer formed with the coating liquid as much as possible and/or make the reaction equivalences of the acid component and the epoxy component as close as possible. However, since the acid component can hardly be dissolved in an organic solvent, it has been difficult to have a large amount of acid component coexisting in the coating liquid (in the reaction system). Moreover, even in the case where a sufficiently large mount of the acid component corresponding to the epoxy component amount can coexist in the coating liquid, a deterioration in the time passage stability is caused due to too high the reactivity of the coating liquid, as a result, the viscosity change (in particular the viscosity rise) can easily be generated in a short time so that there is a risk of difficulty in stable ejection by the ink-jet method.

According to the official gazette of the Japanese Patent Application Laid-Open No. H04-218561, a one liquid type thermosetting composition containing a carboxylic acid blocked product which is produced by blocking a carboxylic group of a polycarboxylic acid by a vinyl type double bond containing compound and a compound which has two or more reactive functional groups to be chemically bonded with a carboxylic acid reproduced from the carboxylic acid blocked product is disclosed. Since this thermosetting type composition makes the polycarboxylic acid, in a state that it is in a form of the blocked product which is not reactive with the reactive functional groups such as an epoxy group, coexist in the thermosetting reaction system, a good storage stability can be provided so that it can be utilized for a paint, an ink, and adhesive, a molded product or the like. However, in the official gazette of the Japanese Patent Application Laid-Open No. H04-218561, application of the thermosetting type composition to a color filter is not discussed.

SUMMARY OF THE INVENTION

In view of the above-mentioned circumstances, the present invention has been achieved, and a first object thereof is to provide a thermosetting type ink-jet ink composition for a color filter with the excellent straightness and sustainability at the time of ejection from a head, and also provide a method for producing such an ink-jet ink composition.

Moreover, a second object is to provide a thermosetting type ink-jet ink composition for a color filter with the excellent straightness and sustain ability at the time of ejection, capable of adhering in a certain pattern utilizing the wettability difference with respect to the substrate surface, and also provide a method for producing such an ink-jet ink composition.

Furthermore, a third object is to provide a method for producing a color filter using the ink composition capable of achieving the above-mentioned objects.

An ink-jet ink composition for a color filter according to the present invention comprises:

(A) an epoxy compound having two or more epoxy groups in a molecule; and (B) a carboxyl group block compound having two or more functional groups represented by the below-mentioned formula 1a or formula 1b,

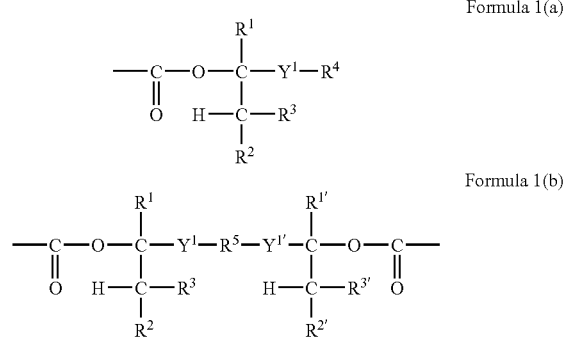

Formula 1(a)

Formula 1(b)

wherein $R^1$, $R^2$, $R^3$, $R^{1'}$, $R^{2'}$ and $R^{3'}$ each denote a hydrogen atom or an organic group having 1 to 18 carbon atoms, $R^4$ and $R^5$ each denote an organic group having 1 to 18 carbon atoms, $Y^1$ and $Y^{1'}$ each denote an oxygen atom or a sulfur atom. $R^3$ and $R^4$ may be bonded with each other so as to form a heterocycle having $Y^1$ as a hetero atom. Moreover, $R^{1'}$, $R^{2'}$, $R^{3'}$ and $Y^{1'}$ may be same as or different from corresponding $R^1$, $R^2$, $R^3$ and $Y^1$, respectively.

In general, the polycarboxylic acid is hardly dissolved in a solvent. In the present invention, such a hardly soluble polycarboxylic acid is made in a form of the highly soluble carboxyl group block compound (B) by blocking (capping, protecting) the carboxylic group of the polycarboxylic acid, and then dissolved or dispersed in a solvent. Therefore, the carboxylic group can coexist in the ink composition at a high concentration of its reaction points (reaction sites) with the epoxy group so that a high cross-linking density can be obtained by forming the ink layer using the ink composition and heating the same. Moreover, unless the carboxylic group block compound (B) is heated to a predetermined temperature or higher according to the compound, a carboxylic group cannot be reproduced. Therefore, even though the reaction point concentrations of the epoxy group contained in the epoxy compound (A) and the carboxyl group contained in the carboxyl group block compound (B) are high, viscosity rise can hardly be generated during the ejecting operation from the recording head of the ink-jet method so that the excellent straightness of drop direction from the ink-jet head and sustainability of drop mass magnitude can be provided as well as a preferable viscosity can be maintained from immediately after preparation over a long term in the state of the ink composition so that the excellent storage stability can be provided as well.

As the epoxy compound (A), it is preferable to use a main polymer (A') having two or more glycidyl groups, comprising at least a constituent unit represented by the below-mentioned formula 2 and a constituent unit represented by the below-mentioned formula 3,

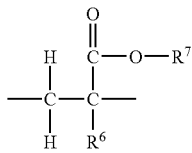

Formula 2 wherein $R^6$ denotes a hydrogen atom or an alkyl having 1 to 3 carbon atoms, and $R^7$ denotes a hydrocarbon group having 1 to 12 carbon atoms or $—(R^8X)_n—R^9$. $R^8$ denotes a substituted or unsubstituted divalent hydrocarbon group having 1 to 5 carbon atoms, X denotes an oxygen atom or a sulfur atom, and $R^9$ is a hydrocarbon group having 1 to 12 carbon atoms. $R^8$ and $R^9$ may be bonded with each other so as to form a heterocycle having X as a hetero atom. Moreover, n is an integer from 1 to 10,

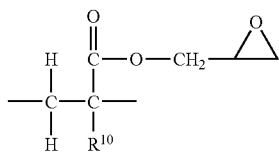

Formula 3 wherein $R^{10}$ denotes a hydrogen atom or an alkyl having 1 to 10 carbon atoms.

As the main polymer (A'), it is preferable to use one having $—(R^8X)_n—R^9$ as $R^7$ in the constituent unit represented by the formula 2, a divalent hydrocarbon group having 1 to 3 carbon atoms as $R^8$, an oxygen atom as X, an alkyl having 1 to 3 carbon atoms as $R^9$, an integer from 1 to 5 as n, and a hydrogen atom or a methyl as $R^{10}$ in the constituent unit represented by the formula 3.

It is preferable that the solvent (E) included as needed in the ink composition contains as the main solvent a solvent component having a 180° C. to 260° C. boiling point and a 133 Pa (0.5 mmHg) or less vapor pressure at an ordinary temperature by a 80% by weight or more ratio with respect to the total amount of the solvent (E).

A solvent component having a 180° C. to 260° C. boiling point and a 133 Pa (0.5 mmHg) or less vapor pressure at an ordinary temperature (particularly in a range from 18° C. to 25° C.) has appropriate drying property and evaporating property. Therefore, by using the solvent containing a high ratio of such a solvent, since it cannot be dried rapidly at the nozzle end of the recording head, drastic viscosity rise of the ink or choking cannot be generated so that the sustainability of drop mass magnitude and the straightness of drop direction can further be improved.

Therefore, by ejecting the ink composition of the present invention to the substrate surface according to a predetermined pattern in the ink-jet method, a coloring layer particularly requiring the minuteness and precision such as a pixel part and a black matrix layer can be formed accurately and evenly.

Moreover, the ink-jet ink composition for a color filter of the present invention cannot be dried rapidly at the nozzle end of the ink-jet head, while it has an appropriate drying property. Therefore, after ejection on the substrate, it can be sufficiently fitted and leveled on the substrate surface, and then dried completely in a relatively short time by air drying or a common heating method. Therefore, a pattern with a high uniformity or evenness can be obtained as well as it can be dried efficiently.

Furthermore, when an ink layer forming area with an ink affinity higher than that of the surroundings is formed by selectively changing the wettability in a predetermined area of the substrate surface and the ink composition of the present invention is shot thereto by the ink-jet method, a certain amount of ink droplets can be provided on the accurate position, furthermore, the impacted ink droplets can be spread to the every part of the ink layer forming area without stagnation at the impacted position so that the ink droplets are swelled without moving beyond the boundary with respect to the ink repellent area which is surrounding the ink layer forming area. Therefore, a thick cured resin layer can be formed accurately.

Particularly in the case where an ink layer forming area with an ink affinity is formed by providing a wettability-variable layer capable of changing the wettability in the direction of enlarging the ink affinity by the function of the photo catalyst on the substrate, and exposing the wettability-variable layer in a predetermined pattern, it is preferable to use an ink composition produced using, as the main solvent, a solvent with a 25° or more contact angle with respect to the surface of a test piece with a 30 mN/m critical surface tension found in a Zisman plotting graph using a standard liquid specified in the wettability test defined in the JIS-K6768, and measuring the contact angle (θ) 30 seconds later from contact with liquid droplets, and a 10° or less contact angle with respect to the surface of a test piece with a 70 mN/m critical surface tension found in the same measurement method, and thus a minute and uniform pattern can efficiently be obtained.

Moreover, as the solvent (E), it is preferable to use a solvent not containing a hydroxyl group. In the case where the solvent contains a hydroxyl group, separation of the blocking agent of the carboxyl group block compound (B) is promoted so that the carboxyl groups can easily appear before the heating process. Therefore, by using a solvent not containing the hydroxyl group as the solvent (E), the viscosity stability of the ink composition can further be improved so that the excellent ink ejection property and storage property can be provided.

It is further preferable that the ink-jet ink composition of the present invention further comprises a multifunctional epoxy resin (C) having two or more epoxy groups in a molecule. Addition of the multifunctional epoxy resin (C) supplements the epoxy group in the ink composition so as to increase the concentration of the epoxy reaction point, thereby improving the cross-linking.

As to the composition ratio of the main polymer (A'), the carboxyl group block compound (B) and the multi functional epoxy resin (C) to be included as needed, it is preferably 10 to 80 parts by weight of the main polymer (A'), 10 to 60 parts by weight of the carboxyl group block compound (B), and 10 to 60 parts by weight of the multifunctional epoxy resin (C) by the weight ratio. In the case of adjusting the composition ratio further accurately in order to obtain a sufficient cross-linking density, it is preferable to adjust the equivalent ratio of the functional group represented by the formula 1a or 1b contained in the carboxyl group block compound (B) and the total epoxy group contained in the main polymer (A') and the multifunctional epoxy resin (C) (reaction equivalence of the functional group of the formula 1/reaction equivalence of the epoxy group) in a range of 0.2 to 2.0.

As the carboxyl group block compound (B) in the ink composition, it is preferable to use a monocyclic aromatic carboxylic acid derivative represented by the below-mentioned formula 5, more specifically, a blocked product of trimesic acid (benzene-1,3,5-tricarboxylic acid) and/or trimellitic acid (benzene-1,2,4-tricarboxylic acid) can be presented.

Formula 5 wherein F3 is a functional group represented by the formula 1a or 1b, and m is an integer of 2 or more.

It is further preferable that the ink composition further comprises a thermal potential catalyst (D) to show the activity at the time of thermal curing, in particular, comprises as the thermal potential catalyst (D) at least one selected from the group consisting of a halogen-free acidic catalyst (D'). By providing such a catalysts, the thermosetting reaction between the acid and the epoxy can be promoted at a tire of thermosetting, so that the hardness and the thermal resistance of the cured resin layer can be improved.

It is preferable that the weight average molecular weight of the main polymer (A') contained in the ink composition is 10,000 or less. In the case where the weight average molecular weight of the main polymer (A') is too large, the viscosity rise can easily be generated so that the risk of deteriorating the sustainability of drop mass magnitude and the straightness of drop direction at the time of ejecting from the recording head, or the risk of deteriorating the long term storage stability are involved.

Moreover, in the case where the weight average molecular weight of the main polymer (A') is 10,000 or less, since the strength or the hardness of the cured resin layer can easily be lowered, it is preferable to provide a multifunctional epoxy resin with four or more epoxy groups in the ink composition for sufficiently improving the cross-linking density.

A pigment can be contained In the ink composition, and it is possible to form a coloring layer such as a pixel part and a black matrix layer. The coloring layer such as the pixel part and the black matrix layer is required to be particularly minute and precise. According to the ink composition of the present invention, even in the case where a pigment is contained, a sufficient dispersing property can be ensured so that a minute coloring layer can be accurately formed by stably ejecting from the head of the ink-let method.

A production method for an ink-jet ink composition for a color filter according to the present invention, comprises the steps of:

preparing a pigment dispersion by mixing a pigment and as needed a pigment dispersing agent with a dispersion preparing solvent containing as the main solvent a solvent having a 180° C. to 260° C. boiling point and a 133 Pa (0.5 mmHg) or less vapor pressure at an ordinary temperature; and, mixing the obtained pigment dispersion, an epoxy compound (A) having two or more epoxy groups in a molecule, and a carboxyl group block compound (B) having two or more functional groups represented by the below-mentioned formula 1a or formula 1b,

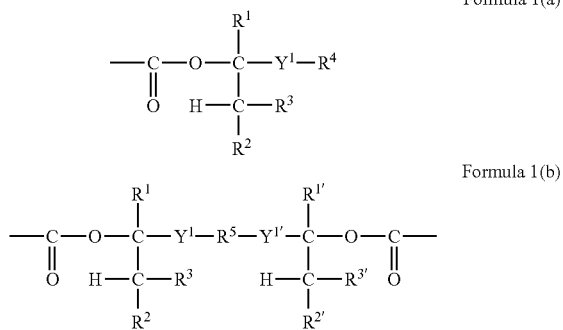

Formula 1(a)

Formula 1(b)

wherein $R^1$, $R^2$, $R^3$, $R^{1'}$, $R^{2'}$ and $R^{3'}$ each denote a hydrogen atom or an organic group having 1 to 18 carbon atoms, $R^4$ and $R^5$ each denote an organic group having 1 to 18 carbon atoms, $Y^1$ and $Y^{1'}$ each denote an oxygen atom or a sulfur atom. $R^3$ and $R^4$ may be bonded with each other so as to form a heterocycle having $Y^1$ as a hetero atom. Moreover, $R^{1'}$, $R^{2'}$, $R^{3'}$ and $Y^{1'}$ may be same as or different from corresponding $R^1$, $R^2$, $R^3$ and $Y^1$, respectively, with the main solvent which is additionally provided so as to adjust the ratio of the main solvent in the total solvent amount to 80% by weight or more.

In the case of directly introducing the pigment into the entire solvent together with the other components such as the binder component, agitating and mixing, the pigment cannot be sufficiently dispersed in the solvent in many cases. Therefore, in the case of providing a pigment in the ink-jet ink composition for a color filter of the present invention, in general, a solvent with good dispersing property and dispersing stability to the pigment is used, and the pigment is introduced therein together with a dispersing agent, thereby preparing a pigment dispersion. Then, the obtained pigment dispersion is mixed with a solvent containing mostly a main solvent or only a main solvent together with the components other than the pigment, thus obtaining an ink composition of the present invention.

DESCRIPTION OF THE PREFERRED EMBODIMENTS

Figure 1:
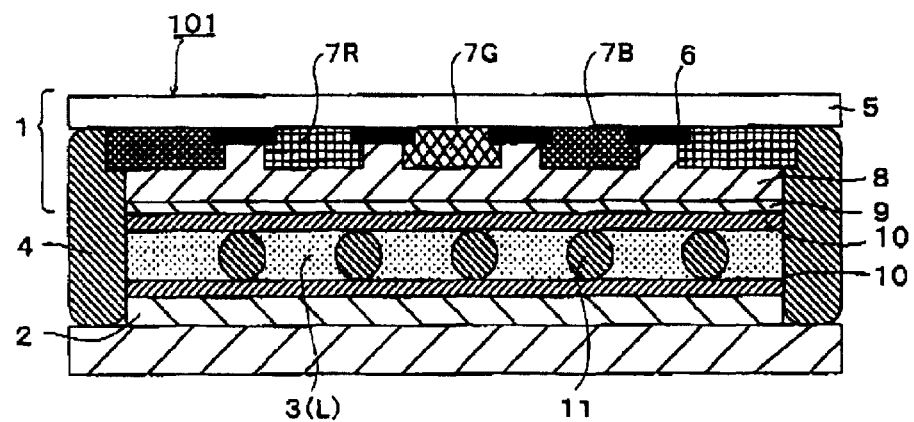
FIG. 1 is a schematically sectional view showing one example of a liquid crystal panel.
Figure 2:
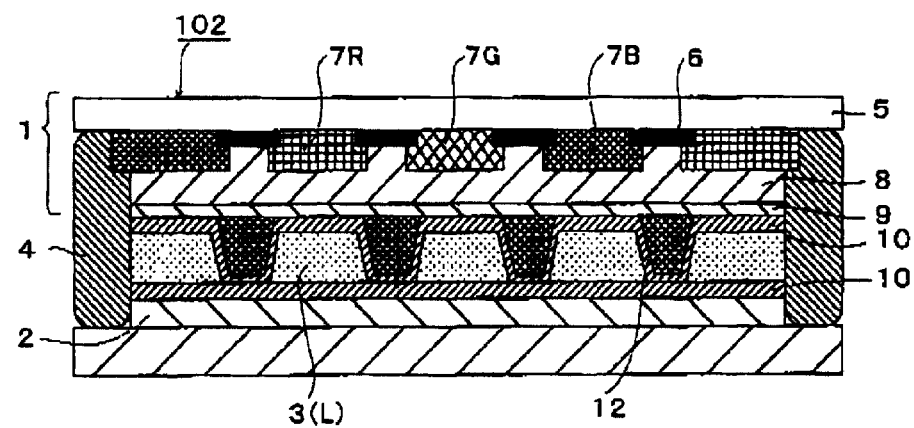
FIG. 2 is a schematically sectional view showing another example of a liquid crystal panel.
Figure 3:
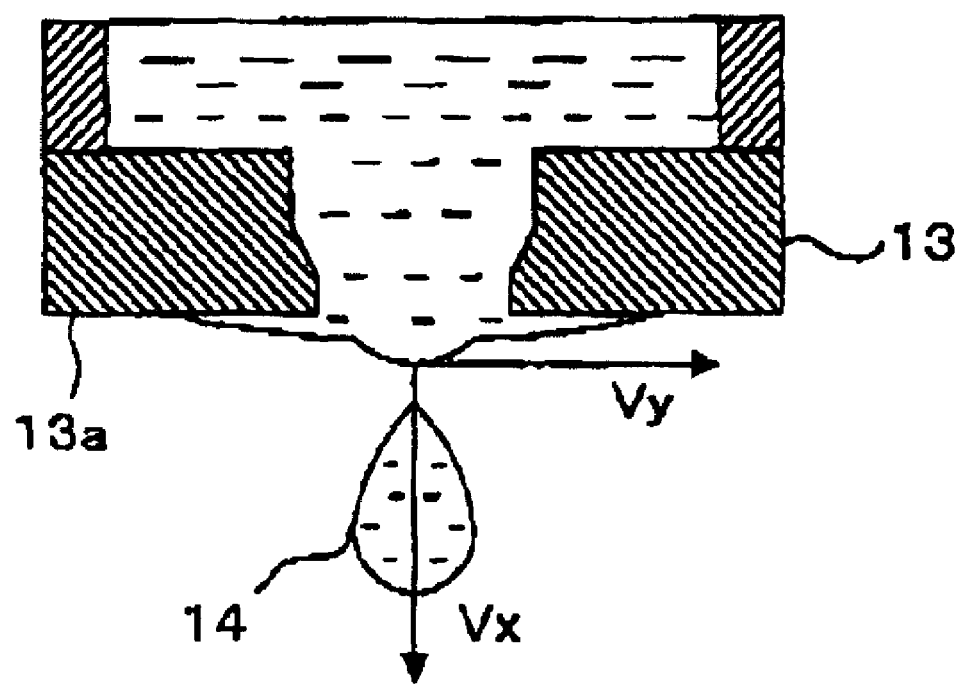
FIG. 3 is a view explaining wetly spreading of an ink on a peripheral surface of an orifice and multiple ejections of ink droplets.

The embodiments of the present invention will be described in detail hereinafter.

An ink-jet ink composition for a color filter according to the present invention is characterized in that it contains as the essential components:

(A) an epoxy compound having two or more epoxy groups in a molecule, and (B) a carboxyl group block compound having two or more functional groups represented by the below-mentioned formula 1a or formula 1b,

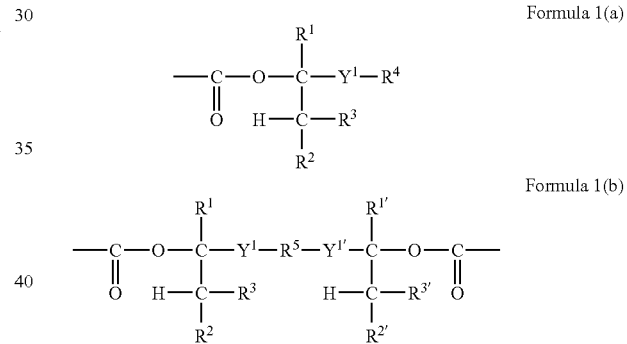

Formula 1(a)

Formula 1(b)

wherein $R^1$, $R^2$, $R^3$, $R^{1'}$, $R^{2'}$ and $R^{3'}$ each denote a hydrogen atom or an organic group having 1 to 18 carbon atoms, $R^4$ and $R^5$ each denote an organic group having 1 to 18 carbon atoms, $Y^1$ and $Y^{1'}$ each denote an oxygen atom or a sulfur atom. $R^3$ and $R^4$ may be bonded with each other so as to form a heterocycle having $Y^1$ as a hetero atom. Moreover, $R^{1'}$, $R^{2'}$, $R^{3'}$ and $Y^{1'}$ may be same as or different from corresponding $R^1$, $R^2$, $R^3$ and $Y^1$, respectively.

(Binder System Included in Ink-Jet Ink Composition)

In the present invention, a binder system composed of, as essential components, (A) an epoxy compound having two or more epoxy groups in its molecule, and (B) a carboxyl group block compound having two or more functional groups represented by the above-mentioned formula 1a or formula 1b. Since this binder system is excellent in storage stability even if the respective reaction point concentrations of the epoxy group and the carboxyl group are high, viscosity rise can hardly be generated during the ejecting operation from the recording head of the ink-jet method, thereby enabling a stable ejection. Thus multiple ejections of the shot droplets and choking of the recording head are hardly generated. Further, storage ability in a long term is also excellent.

The epoxy compound (A) having two or more epoxy groups in its molecule (it will be simply called hereafter as "a component (A)" or "an epoxy compound (A)") is an epoxy compound having 2 or more epoxy groups, preferably 2 to 50 epoxy groups, and more preferably 2 to 20 epoxy groups in one molecular, and it includes the compounds called as "an epoxy resin". The chemical structure containing an oxirane cycle can fall into the range of the epoxy group, and there may be exemplified glycidyl group, oxyethylene group, epoxycyclohexyl group or the like.

As the epoxy compound (A), there may be exemplified a known multifunctional epoxy compound which can be cured by a carboxylic acid. Such an epoxy compound is disclosed in many reference books, for example, "The epoxy resin handbook" (edited by Masaki Jinbo, published by Nikkan kogyo shinbun Corp. (1987)), and the disclosed compounds can be used in the present invention. Concrete examples include: bisphenol A type epoxy resins, bisphenol F type epoxy resins, bromo bisphenol A type epoxy resins, bisphenol S type epoxy resins, diphenyl ether type epoxy resins, hydroquinone type epoxy resins, naphthalene type epoxy resins, biphenyl type epoxy resins, fluorene type epoxy resins, phenol novolak type epoxy resins, orhtocresol novolak type epoxy resins, tris(hydroxyphenyl)methane type epoxy resins, trifunctional epoxy resins, tetraphenylol ethane type epoxy resins, dicyclopentadiene phenol type epoxy resins, hydrogenated bisphenol A type epoxy resins, polyol-containing bisphenol A type epoxy resins, polypropylene glycol type epoxy resins, glycidyl ester type epoxy resins, glycidyl amine type epoxy resins, glyoxal type epoxy resins, alicyclic type epoxy resins, heterocyclic type epoxy resins or the like.

It is preferable to use, as the epoxy compound (A), a main polymer (A') whose molecular structure is constituted of at least a constituent unit represented by the below-mentioned formula 2 and a constituent unit represented by the below-mentioned formula 3, and has two or more glycidyl groups in one molecule.

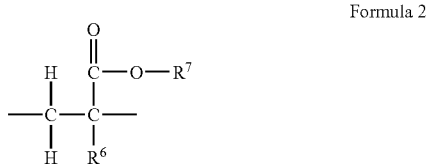

Formula 2 wherein $R^6$ denotes a hydrogen atom or an alkyl having 1 to 3 carbon atoms, and $R^7$ denotes a hydrocarbon group having 1 to 12 carbon atoms or —$(R^8X)_n$—$R^9$. $R^8$ denotes a substituted or unsubstituted divalent hydrocarbon group having 1 to 5 carbon atoms, X denotes an oxygen atom or a sulfur atom, and $R^9$ is a hydrocarbon group having 1 to 12 carbon atoms. $R^8$ and $R^9$ may be bonded with each other so as to form a heterocycle having X as a hetero atom. Moreover, n is an integer from 1 to 10,

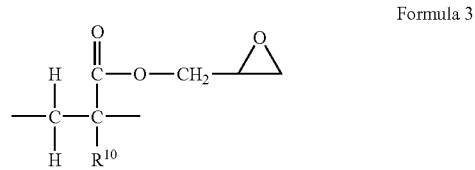

Formula 3 wherein $R^{10}$ denotes a hydrogen atom or an alkyl having 1 to 10 carbon atoms.

The constituent unit represented by the formula 2 can be derived from a monomer represented by the below-mentioned formula 8,

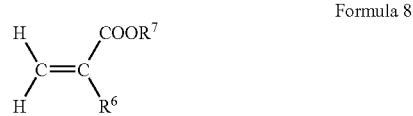

Formula 8 wherein $R^6$ and $R^7$ are the same as those in the formula 2 respectively.

The monomer represented by the formula B is used in order to provide sufficient hardness and transparency for a cured coating layer formed from the ink-jet ink composition of the present invention. In the formula 8, $R^7$ is a hydrocarbon group having 1 to 12 carbon atoms or —$(R^8X)_n$—$R^9$, wherein $R^8$ is a substituted or unsubstituted divalent hydrocarbon group having 1 to 5 carbon atoms, X is an oxygen atom or a sulfur atom, and $R^9$ is a hydrocarbon group having 1 to 12 carbon atoms. $R^8$ and $R^9$ may be bonded with each other so as to form a heterocycle having X as a hetero atom. Moreover, n is an integer from 1 to 10. $R^7$ may be any one of aliphatic, alicyclic and aromatic hydrocarbon groups, and it may contain an additional structure, for example, a double bond, a hydrocarbon group as a side chain, a spiro cycle as a side chain, an endocyclic cross linkage in a cyclic hydrocarbon group or the like. Further, in a case where $R^7$ is —$(R^8X)_n$—$R^9$, two or more kinds of divalent hydrocarbon groups different in number of carbon atom may coexist among plural repeating units —$(R^8X)$— in one molecular.

Concrete examples of the monomer represented by the formula 8 include: methyl (meth)acrylate, ethyl (meth)acrylate, i-propyl (meth)acrylate, n-propyl (meth)acrylate, i-butyl (meth)acrylate, n-butyl (meth)acrylate, t-butyl (meth)acrylate, 2-ethyhexyl (meth)acrylate, hexyl (meth)acrylate, octyl (meth)acrylate, lauryl (meth)acrylate, cyclohexyl (meth) acrylate, para-t-butyl cyclohexyl (meth)acrylate, isobornyl (meth)acrylate, benzyl (meth)acrylate, dicyclopentenyl (meth)acrylate, phenyl (meth)acrylate or the like. Further there may be exemplified: methoxyethyl (meth)acrylate, ethoxyethyl (meth)acrylate, methoxypolyethylene glycol mono (meth)acrylate, methoxyphenyl (meth)acrylate. It is to be noted that the term "(meth)acrylate" means, in the present invention, it maybe any one of an acrylate and a methacrylate.

In the formula 8, hydrogen atom and methyl group are preferable as $R^6$, and —$(R^8X)_n$—$R^9$ is preferable as $R^7$. Further it is particularly preferable for the —$(R^8X)_n$—$R^9$ that $R^8$ is a substituted or unsubstituted divalent hydrocarbon group having 1 to 3 carbon atoms, X denotes the oxygen atom, $R^9$ is a hydrocarbon group having 1 to 5 carbon atoms, and n is an integer from 1 to 5, and a methoxy polyethyleneglycol group (in particular, methoxyethyl group) is particularly preferable as the —$(R^8X)_n$—$R^9$. Methoxyethyl acrylate (MEA) and methoxy polyethyleneglycol mono(metha)acrylate are preferable ones among the monomer represented by the formula 8.

The constituent unit represented by the formula 3 in the main polymer (A') can be derived from a monomer represented by the below-mentioned formula 9,

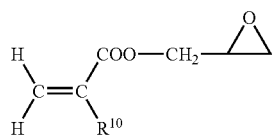

Formula 9 wherein $R^{10}$ is the same as that in the formula 3.

The monomer represented by the formula 9 is used in order to introduce the epoxy group (the reaction point of epoxy) into the main polymer (A'). An ink composition containing the main polymer (A') is excellent in the storage stability, and hardly generates the viscosity rise during the storage and the ejecting operation, one reason of which is presumed that the epoxy groups in the formula 3 and the formula 9 are the glycidyl groups. If an alicyclic epoxy acrylate is used instead of the monomer represented by the formula 9, a coating liquid for the protect layer is liable to increase the viscosity.

In the formula 9, hydrogen atom and methyl group are preferable as $R^{10}$. Specifically, glycidyl (meth)acrylate can be exemplified as the monomer represented by the formula 9, and glycidyl methacrylate (GMA) is particularly preferable.

The main polymer (A') may be a random copolymer or a block copolymer. Further main polymer (A') can contain constituent units forming the principal chain (the stem chain) other than the formulas 2 and 3 insofar as securing performances required for detail portions of the color filter such as hardness, transparency or the like. Concrete examples of such a monomer include acrylic amide, acrylonitrile, styrene or the like.

When an composition ratio of the constituent units of the formula 2 and the formula 3 contained in the main polymer (A') is defined as a weight ratio of feeding amounts of the monomer deriving the constituent unit of the formula 2 and the constituent unit of the formula 3 (the monomer deriving the formula 2: the monomer deriving the formula 3), the composition ratio is preferable in a range of 10:90 to 90:10. In a case where the amount of the constituent unit of the formula 2 is excess, the density of crosslinks may be decreased due to decrease of the reaction points for curing. On the other hand, in a case where the amount of the constituent unit of the formula 3 is excess, the curing shrinkage may be increased due to decrease of bulky portions in a polymer chain.

A glass transition temperature (Tg) of the main polymer (A') is preferable in a range of 70° C. or less, particularly 30° C. or less in order to prevent a coated layer of the ink composition of the present invention from cracking at the time of drying and thermally curing (baking) the same. A polymer in which the monomer represented by the formula 8 deriving the constituent unit of the polymer has $R^6$ and $R^7$ in a range of the above-mentioned preferable structure, that is, $R^6$ is hydrogen atom or methyl and $R^7$ is —$(R^8X)_n$—$R^9$ (Further it is particularly preferable for the —$(R^8X)_n$—$R^9$ that $R^8$ is a substituted or unsubstituted divalent hydrocarbon group having 1 to 3 carbon atoms, X denotes the oxygen atom, $R^9$ is a hydrocarbon group having 1 to 5 carbon atoms, and n is an integer from 1 to 5.), in many time, fall into the main polymer (A') with such a range of Tg.

Among the main polymer (A') with 70° C. or less of Tg, one synthesized from a bulky monomer such as methoxyethyl acrylate (MEA), methoxypoly(n)ethyleneglycol monomethacrylate (Blemmer PME-100 (n≈2) and Blemmer PME-400 (n≈9), in the trade names produced by NOF CORPORATION respectively) or the like, as the monomer represented by the formula 8, is estimated to have a particularly high flexibility of the polymer, and it is effective for prevention of cracking.

The reason why the use of the main polymer (A') with 70° C. or less of Tg can prevent the cracking is as follows. That is, the coating layer made of the ink composition of the present invention is commonly dried by evaporating a solvent at a prebake stage, and thereafter thermally cured by a postbaking, and thus made into a desired cured coating layer. In the process, if the drying operation is carried out at a relatively high temperature during the prebake stage, a dried coating layer with an uniform thickness in a case where applied to a flat base or with a highly even surface in a case where applied to an uneven base such as a convex-concave surface is obtained according to the a reason mentioned after, and as a result, a cured coating layer with a highly even surface can be formed via a subsequent postbaking. However, since a drying speed becomes excessively high if carrying out the prebake at a high temperature, the reduction of layer thickness (or the volume reduction of the coating layer) drastically progresses to promote the cracking. In contrast with this, a coating layer made of the ink composition containing the main polymer (A') with 70° C. or less of Tg is presumed to have a flexibility capable of absorbing stress or distortion generated inside of the coating layer even when the thickness reduction of the coating layer drastically progresses due to a high temperature of the baking operation, in particular, a high temperature at the prebaking stage, and thus the cracking is hardly caused. Therefore it is particularly preferable for a prevention of the cracking and a control of the coating layer in its configuration or thickness at the time when forming the cured coating layer such as the pixel or the like.

It is preferable that the weight average molecular weight of the main polymer (A') is 10,000 or less, particularly in a range of 2,000 to 4,000 in terms of the polystyrene calibrated-weight average molecular weight. If the molecular weight of the main polymer (A') is excessively small, physical properties required for the cured resin layer as the detail portions of the color filter such as strength, solvent resistance or the like is liable to be insufficient. On the other hand, if this molecular weight is excessively large, the viscosity is liable to rise, thereby involving the risks that sustainability of drop mass magnitude and straightness of drop direction at the time when ejecting the ink from the recording head is deteriorated, and that stability during a long term-storage is deteriorated.

As the main polymer (A'), it is particularly preferable to use glycidyl methacrylate (GMA)/methoxyethyl acrylate (MEA) based copolymers with 2,000 to 4,000 of the polystyrene calibrated-weight average molecular weight. It is to be noted that the GMA/MEA based copolymers can contain the other constituent unit derived from the other monomer component insofar as it can achieve the objects of the present invention.

In one example of synthesizing the main polymer (A'), for example, a solvent not containing a hydroxyl group is fed into a four-neck flask provided with a thermometer, a reflux condenser, a agitator and a dropping funnel, and its temperature is raised at 140° C. while agitating. The solvent not containing a hydroxyl group is used in order to avoid decomposing the epoxy group during the synthesizing reaction. Subsequently a mixture of a composition which combines the monomer represented by the above formula 8, the monomer represented by the above formula 9 and the other monomer as required and a polymerization initiator (i.e., a dropping material) is dropped into the solvent from the dropping funnel at constant speed by two hours. After the dropping operation, a temperature of the mixture is lowered at 110° C., and a catalyst is added therein, and it is maintained at a temperature of 110° C. by two hours to finish the reaction, and thus the main polymer (A') is obtained.

The carboxyl group block compound (B) having two or more functional groups represented by the above-mentioned formula 1a or formula 1b is a curing agent for the main polymer mentioned above, and it is a capped product in which the carboxyl group is blocked or protected by reacting a polycarboxylic acid with a compound having a vinyl type double bond.

Among the carboxyl group block compound (B), one having two or more functional groups represented by the formula 1a can be obtained by reacting the polycarboxylic acid with a compound represented by a below-mentioned formula 10 which may be a vinyl ether compound, a vinyl thioether compound or a heterocyclic compound having the oxygen or sulfur atom as a hetero atom and containing a vinyl type double bond in the heterocyclic structure.

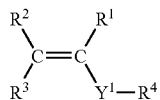

Formula 10 wherein $R^1$, $R^2$, $R^3$, $R^4$, and $Y^1$ are the same as those in the formula 1a respectively.

Each of $R^1$, $R^2$, and $R^3$ in the formulas 1a and 10 is a hydrogen atom or an organic group having 1 to 18 carbon atoms such as alkyl, aryl, alkylaryl or the like, and $R^4$ is an organic group having 1 to 18 carbon atoms such as alkyl, aryl, alkylaryl or the like, and those organic groups may have a proper substitutional group. Further $R^3$ and $R^4$ may be bonded with each other so as to form a heterocycle having $Y^1$ as a hetero atom. Moreover, $R^{1'}$, $R^{2'}$, $R^{3'}$ and $Y^{1'}$ may be same as or different from corresponding $R^1$, $R^2$, $R^3$ and $Y^1$, respectively.

Concrete examples of the compound represented by the formula 10 include: aliphatic vinyl ether compounds such as methyl vinyl ether, ethyl vinyl ether, iso-propyl vinyl ether, n-propyl vinyl ether, n-butyl vinyl ether, iso-butyl vinyl ether, t-butyl vinyl ether, 2-ethylhexyl vinyl ether, cyclohexyl vinyl ether; aliphatic vinyl thioether compounds corresponding to these exemplified aliphatic vinyl ether compounds; cyclic vinyl ether compounds such as 2,3-dihydrofuran, 3,4-dihydrofuran, 2,3-dihydro-2H-pyran, 3,4-dihydro-2H-pyran, 3,4-dihydro-2-methoxy-2H-pyran, 3,4-dihydro-4,4-dimethyl-2H-pyran-2-one, 3,4-dihydro-2-ethoxy-2H-pyran, Sodium 3,4-dihydro-2H-pyran-2-carboxylate; and cyclic vinyl thioether compounds corresponding to these exemplified cyclic vinyl ether compounds.

In a case where using, as the compound represented by the formula 10, a primary alkyl vinyl ether which has a dissociation temperature higher than that of a secondary and a tertiary alkyl vinyl ether, in particular, using normal propyl vinyl ether (about 140° C. of the dissociation temperature) and/or normal butyl vinyl ether (about 160° C. of the dissociation temperature), it is possible to prevent the coating layer from cracking at a time of drying and thermosetting (baking).

The reason why the use of the carboxyl group block compound (B) with the primary alkyl vinyl ether can prevent the cracking is as follows. That is, the coating layer made of the ink composition of the present invention is commonly dried by evaporating a solvent at a prebake stage, and thereafter thermally cured by a postbaking, and thus made into a desired cured coating layer. In the process, if the drying operation is carried out at a relatively high temperature during the prebake stage, a dried coating layer with an uniform thickness in a case where applied to a flat base or with a highly even surface in a case where applied to an uneven base such as a convex-concave surface is obtained according to the a reason mentioned after, and as a result, a cured coating layer with a highly even surface can be formed via a subsequent postbaking. However, if the coating layer is formed with the use of the ink composition containing a carboxyl group block compound (B) with a low dissociation temperature of the vinyl ether and subjected to the prebaking at a high temperature, the reduction of layer thickness (or the volume reduction of the coating layer) drastically progresses as mentioned above, and at the same time, a temperature of the coating layer reaches the dissociation temperature of the vinyl ether during the prebaking stage to coincidentally progress the thermosetting reaction of the epoxy compound. Accordingly stress or distortion is generated inside the coating layer, thus causing the cracking.

In contrast with this, since a coating layer made of the ink composition containing the carboxyl group block compound (B) with the primary alkyl vinyl ether which has a dissociation temperature higher than that of a secondary and a tertiary alkyl vinyl ether can avoid the coincident progress of the thermosetting reaction even when the thickness reduction of the coating layer drastically progresses due to a high temperature of the prebaking operation, it is presumed to have a flexibility capable of absorbing stress or distortion generated inside of the coating layer, thus hardly causing the cracking. After forming the dried coating layer which is even and not cracked by prebaking, dissociation of the primary alkyl vinyl ether can be started by further raising a beat temperature at the postbaking stage to selectively carried out the thermosetting reaction. Therefore it is particularly preferable for a prevention of the cracking and a control of the coating layer in its configuration or thickness at the time when forming the cured coating layer such as the pixel or the like.

Among the carboxyl group block compound (B), one having two or more functional groups represented by the formula 1b can be obtained by reacting the polycarboxylic acid with a compound represented by a below-mentioned formula 11 which may be a divinyl ether compound or a divinyl thioether compound.

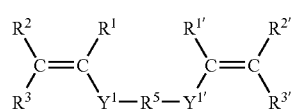

Formula 11 wherein $R^1$, $R^2$, $R^3$, $Y^1$, $R^{1'}$, $R^{2'}$, $R^{3'}$, $Y^{1'}$ and $R^5$ are the same as those in the formula 1b respectively.

Two vinylic structures each of which can protect the carboxyl group are present in one molecule of the divinyl ether compound and the divinyl thioether compound represented by the formula 11. Accordingly, when the polycarboxylic acid, in particular, a dibasic carboxylic acid is reacted with the divinyl ether compound and the divinyl thioether compound represented by the formula 11, a carboxyl group block compound (B) of a polymer type which has two or more functional groups represented by the formula 1b as a constituent unit of a principal chain.

As the compound represented by the formula 11, there may be exemplified: the divinyl ether compound such as 1,4-cyclohexane dimethanol divinyl ether, 1,4-cyclohexane diol divinyl ether, 1,9-nonane diol divinyl ether, 1,6-hexane diol divinyl ether, 1,4-butane diol divinyl ether, ethylene glycol divinyl ether, diethylene glycol divinyl ether, triethylene glycol divinyl ether, tetraethylene glycol divinyl ether, bisphenol A divinyl ether, hydrogenated bisphenol A divinyl ether; and the divinyl thioether compounds corresponding these exemplified divinyl ether compounds.

As the polycarboxylic acid to be protected by the compound containing the vinyl type double bond represented by the formula 10 or 11, there may be exemplified; an aliphatic polycarboxylic acid such as succinic acid, adipic acid, 1,2,3,4-butane tetracarboxylic acid, azelaic acid, sebacic acid, decamethylene dicarboxylic acid or the like; an aromatic polycarboxylic acid such as phthalic acid, isophthalic acid, terephthalic acid, trimellitic acid, pyromellitic acid or the like; an alicyclic polycarboxylic acid such as tetrahydrophthalic acid, hexahydrophthalic acid or the like; and a polymer-carboxylic acid such as polyester resin, acrylic resin and maleic polybutadiene resin having two or more carboxyl groups in a molecule respectively.

As the other examples of the polycarboxylic acid includes the products obtainable by any one of the following methods:

(1) To make a half-ester by reacting a polyol having two or more hydroxyl groups in one molecule with an acid anhydride;

(2) To react a polyisocyanate compound having two or more isocyanate groups in one molecule with a hydroxy carboxylic acid or an amino acid by the addition reaction;

(3) To polymerize a carboxyl group-containing α, β-unsaturated monomer solely, or to copolymerize it with the other α, β-unsaturated monomer; and, (4) To synthesize a polyester resin with terminations having carboxyl groups.

In these methods, it is possible to use as the polyol, for example, ethylene glycol, 1,2-propylene glycol, 1,3-propylene glycol or the like: it is possible to use as the acid anhydride, for example, polycarboxylic acid anhydride such as succinic acid, glutaric acid, adipic acid or the like; it is possible to use as the polyisocyanate compound, for example, p-phenylene diisocyanate, biphenyl diisocyanate or the like; it is possible to use as the hydroxycaboxylic acid, for example, citric acid, hydroxypivalic acid or the like; it is possible to use as the amino acid, for example, DL-alanine, L-glutamic acid or the like; it is possible to use as the α, β-unsaturated monomer having carboxyl group, for example, acrylic acid, methacrylic acid, itaconic acid or the like; and it is possible to use as the other α, β-unsaturated monomer, for example, methyl (meth)acrylate, ethyl (meth)acrylate, n-propyl (meth)acrylate or the like. Further the polyester resin with terminations having carboxyl groups can be easily formed by reacting the polyhydric alcohol under an excessive amount of the polybasic acid according to the common synthesis method of polyester resin.

Usually, the carboxyl group is protected (blocked) by reacting the above-mentioned polycarboxylic acid with the vinyl type double bond-containing compound represented by the formula 10 or 11 also mentioned above at a temperature in a range of the room temperature to 100° C. in the presence of an acid catalyst, thereby obtaining the carboxyl group block compound (B) having two or more functional groups represented by the formula 1a or 1b. A polycarboxylic acid having about 2-14 carboxyl groups in one molecule is suitable. It is preferable that an acid equivalence of the polycarboxylic acid is 50 g/mol or more in order to increase the density of the reaction points of acid by introducing a large amount of carboxyl group into the carboxyl group block compound (B). Further it is preferable that the polystyrene calibrated-weight average molecular weight of the carboxyl group block compound (B) is 10,000 or less in order to improve the storage stability (the viscosity stability) of the ink composition.

Concrete examples to be preferably used as the carboxyl group block compound (B) include an aromatic carboxylic acid derivative represented by the below-mentioned formula 4.

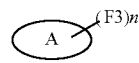

Formula 4 wherein a cyclic structure A denotes an aromatic hydrocarbon cycle, F3 denotes the functional group represented by the formula 1a or the formula 1b, and n is an integer from 2 or more.

The aromatic carboxylic acid derivative represented by the formula 4 can be obtained by blocking an aromatic polycarboxylic acid represented by the below-mentioned formula 6.

Formula 6 wherein the cyclic structure A and n are the same as those in the formula 4 respectively.

As the aromatic polycarboxylic acid represented by the formula 6, there may be exemplified isophthalic acid, terephthalic acid, trimesic acid (i.e., benzene-1,3,5-tricarboxylic acid), trimellitic acid (i.e., benzene-1,2,4-tricarboxylic acid), 2,6-naphthalene dicaboxylic acid, pyromellitic acid or the like.

Among the aromatic carboxylic acid derivative represented by the formula 4, a monocyclic aromatic carboxylic acid derivative represented by the below-mentioned formula 5 is particularly preferable,

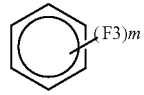

Formula 5 wherein F3 is the same as that in the formula 4, and m is an integer from 2 or more.

The monocyclic aromatic carboxylic acid derivative represented by the formula 5 can be obtained by blocking an monocyclic aromatic polycarboxylic acid represented by the below-mentioned formula 7.

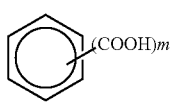

Formula 7 wherein m is the same as that in the formula 4.

Among the compounds exemplified for the formula 6, isophthalic acid, terephthalic acid, trimesic acid and trimellitic acid are fallen into the range of the monocyclic aromatic polycarboxylic acid represented by the formula 7, and ones having 3 carboxyl groups, namely trimesic acid and trimellitic acid are preferable. In a case where using glycidyl methacrylate as the epoxy component (the constituent unit of the formula 2) in the main polymer (A'), the use of trimellitic acid can provide an excellent hardness of the coating layer, and it is particularly preferable.

In the present invention, it is preferable to add (C) a multifunctional epoxy resin having two or more epoxy groups in one molecule. Though the main polymer (A') contains the epoxy groups (the glycidyl group) which is introduced therein by the constituent unit represented by the formula 3, an allowable amount of the epoxy group to be introduced into a molecule of the main polymer (A') is limited to a certain extent. When the multifunctional epoxy resin (C) is added into the ink composition, the epoxy group is supplemented in the ink composition so as to increase the concentration of reaction points of the epoxy reaction, thereby improving the cross-linking density.

Among the multifunctional epoxy resin, it is preferable to use an epoxy resin having 4 or more epoxy groups in one molecule in order to raise a crosslinking density of the acid-epoxy reaction. In a case where the weight average molecular weight of the main polymer (A') is set to 10,000 or less in order to improve the ejecting performance from the recording head of the ink jet method, strength or hardness of a cured resin layer is particularly liable to be decreased. Accordingly it is preferable for such a case to add the 4 or more functional epoxy resin into the ink composition and sufficiently raise the crosslinking density.

As the multifunctional epoxy resin (C), one having two or more epoxy groups in one molecule can be used, and it is not limited within a specific kind. Examples thereof include bisphenol A type epoxy resins, bisphenol F type epoxy resins, bromo bisphenol A type epoxy resins, bisphenol S type epoxy resins, diphenyl ether type epoxy resins, hydroquinone type epoxy resins, naphthalene type epoxy resins, biphenyl type epoxy resins, fluorene type epoxy resins, phenol novolak type epoxy resins, orhtocresol novolak type epoxy resins, tris(hydroxyphenyl)methane type epoxy resins, trifunctional epoxy resins, tetraphenylol ethane type epoxy resins, dicyclopentadiene phenol type epoxy resins, hydrogenated bisphenol A type epoxy resins, polyol-containing bisphenol A type epoxy resins, polypropylene glycol type epoxy resins, glycidyl ester type epoxy resins, glycidyl amine type epoxy resins, glyoxal type epoxy resins, alicyclic type epoxy resins, heterocyclic type epoxy resins or the like.

More specifically, examples of trade name for those epoxy resins are as follows: bisphenol A type epoxy resins such as Epi Coat 828 (in the trade name produced by Japan Epoxy Resin Corp.), bisphenol F type epoxy resins such as YDF-175S (in the trade name produced by Touto Kasei Corp.), bromo bisphenol A type epoxy resins such as YDB-715 (in the trade name produced by Touto Kasei Corp.), bisphenol S type epoxy resins such as EPICLON EXA1514 (in the trade name produced by Dainippon Ink Chemicals Inc.), hydroquinone type epoxy resins such as YDC-1312 (in the trade name produced by Touto Kasei Corp.), naphthalene type epoxy resins such as EPICLON EXA4032 (in the trade name produced by Dainippon Ink Chemicals Inc.), biphenyl type epoxy resins such as Epi Coat YX4000H (in the trade name produced by Japan Epoxy Resin Corp.), bisphenol A phenol novolak type epoxy resins such as Epi Coat 151570 (in the trade name produced by Japan Epoxy Resin Corp.), phenol novolak type epoxy resins such as YDPN-638 (in the trade name produced by Touto Kasei Corp.), cresol novolak type epoxy resins such as YDCN-701 (in the trade name produced by Touto Kasei Corp.), dicyclopentadiene phenol type epoxy resins such as EPICLON HP-7200 (in the trade name produced by Dainippon Ink Chemicals Inc.), tris(hydroxyphenyl)methane type epoxy resins such as Epi Coat 1032H60 (in the trade name produced by Japan Epoxy Resin Corp.), trifunctional epoxy resins such as VG3101M80 (in the trade name produced by Mitsui Chemical Corp.), tetraphenylol ethane type epoxy resins such as Epi Coat 1031S (in the trade name produced by Japan Epoxy Resin Corp.), four functional type epoxy resins such as Denacoal EX-411 (in the trade name produced by Nagase Kasei Kogyo Corp.), hydrogenated bisphenol A type epoxy resins such as ST-3000 (in the trade name produced by Touto Kasei Corp.), glycidyl ester type epoxy resins such as Epi Coat 190P (in the trade name produced by Japan Epoxy Resin Corp.), glycidyl amine type epoxy resins such as YH-434 (in the trade name produced by Touto Kasei Corp.), glyoxal type epoxy resins such as YDG-414 (in the trade name produced by Touto Kasei Corp.), alicyclic polyfunctional type epoxy resins such as Epolead GT-401 (in the trade name produced by Daisel Chemical Industries Ltd,.), heterocyclic type epoxy resins such as triglycidyl isocyanate (TGIC) or the like.

Further a diluent having epoxy reactivity such as Neotouto E (in the trade name produced by Touto Kasei Corp.) or the like can be mixed into the ink composition.

Among these multifunctional epoxy resin, the bisphenol A phenol novolak type epoxy resins such as Epi Coat 157S70 (in the trade name produced by Japan Epoxy Resin Corp.) and the cresol novolak type epoxy resins such as YDCN-701 (in the trade name produced by Touto Kasei Corp.) are particularly preferable.

In the present application, a catalyst capable of promoting the thermosetting reaction between the acid and the epoxy may be added into ink-jet ink composition in order to improve the hardness and the thermal resistance of the cured resin layer. A thermal potential catalyst (D) capable of showing the activity at the time of thermal curing (it will be simply called hereafter as "a component (D)" or "a thermal potential catalyst (D)") can be used as such a catalyst.

When the thermal potential catalyst (D) is added into the ink-jet ink composition of the present invention and heated therein, it exhibits the catalytic activity to promote the curing reaction, thereby providing good physical properties for a cured product. As the thermal potential catalyst (D), one starting its acid catalyst-activity when a heating temperature rises at 60° C. or more is preferable, and examples to be preferably used include: a compound produced by neutralizing a proton acid with a Lewis base; a compound produced by neutralizing a Lewis acid with a Lewis base; a mixture of a Lewis acid and a trialkyl phosphate; sulfonic acid esters; onium compounds; or the like, and various compounds disclosed in the above-mentioned the Japanese Patent Application Laid-Open No. H04-218561 or the like can be also used.

More specifically, the following compounds can be exemplified as the preferable thermal potential catalyst (D):

(i) A compound produced by neutralizing the proton acid such as halogeno carboxylic acids, sulfonic acids, phosphoric monoesters, phosphoric diesters or the like with the Lewis base such as amines (ammonia, monomethyl amine, triethyl amine, pyridine, ethanolamines or the like), trialkylphosphine or the like;

(ii) A compound produced by neutralizing a Lewis acid such as $BF_3$, $FeCl_3$, $SnCl_4$, $AlCl_3$, $ZnCl_2$ or the like with the Lewis base such as any one of the compounds exemplified above;

(iii) An ester compound produced by reacting sulfonic acids such as methanesulfonic acid, ethanesulfonic acid, benzensulfonic acid or the like with alcohols such as primary alcohol, secondary alcohol or the like;

(iv) A phosphoric monoester or diester compounds derived from primary alcohols, secondary alcohols or the like; and, (v) An onium compound such as ammonium compound $[R_3NR']^+X^-$, sulfonium compound $[R_3SR']^+X^-$, oxonium compound $[R_3OR']^+X^-$ or the like, wherein R and R' are groups such as alkyl, alkenyl, aryl, alkoxy or the like respectively.

It is preferable that the thermal potential catalyst (D) is (D') a halogen-free acidic catalyst (it will be simply called hereafter as "a component (D')" or "a halogen-free acidic catalyst (D')") in view of contamination of the liquid crystal or the like. Concrete examples of the halogen-free acidic catalyst (D') include Nofcure LC-1 and Nofcure LC-2 both in the trade name (produced by NOF CORPORATION).

(Pigment)

In a case where a coloring layer such as a pixel part, a black matrix layer or the like is formed using the ink-jet ink composition of the present invention, a pigment or the other coloring agent is contained in the ink composition.

The pigment to be used as the coloring agent can be optionally selected among organic and inorganic coloring agents in accordance with a required color such as R, G, B or the like of the pixel part. As the organic coloring agent, it is possible to use, for example, dyes, organic pigments, natural coloring matters or the like. Further, as the inorganic coloring agents, it is possible to use, for example, inorganic pigments, extender pigments or the like.

Among these material, the organic pigment is superior in the coloring property and also the thermal resistance, and preferably used. As the organic pigment, there may be exemplified compounds sorted in the Pigment group by the color index (C.I.; published by the society of dyers and colourists Corp.), and more specifically exemplified ones identified by the following color index (C.I.) numbers:

C. I. Pigment Yellow 1, C. I. Pigment Yellow 3, C. I. Pigment Yellow 12, C. I. Pigment Yellow 13, C. I. Pigment Yellow 14, C. I. Pigment Yellow 15, C. I. Pigment Yellow 16, C. I. Pigment Yellow 17, C. I. Pigment Yellow 20, C. I. Pigment Yellow 24, C. I. Pigment Yellow 31, C. I. Pigment Yellow 55, C. I. Pigment Yellow 60, C. I. Pigment Yellow 61, C. I. Pigment Yellow 65, C. I. Pigment Yellows 71, C. I. Pigment Yellow 73, C. I. Pigment Yellow 74, C. I. Pigment Yellow 81, C. I. Pigment Yellow 83, C. I. Pigment Yellow 93, C. I. Pigment Yellow 95, C. I. Pigment Yellow 97, C. I. Pigment Yellow 98, C. I. Pigment Yellow 100, C. I. Pigment Yellow 101, C. I. Pigment Yellow 104, C. I. Pigment Yellow 106, C. I. Pigment Yellow 108, C. I. Pigment Yellow 109, C. I. Pigment Yellow 110, C. I. Pigment Yellow 113, C. I. Pigment Yellow 114, C. I. Pigment Yellow 116, C. I. Pigment Yellow 117, C. I. Pigment Yellow 119, C. I. Pigment Yellow 120, C. I. Pigment Yellow 126, C. I. Pigment Yellow 127, C. I. Pigment Yellow 128, C. I. Pigment Yellow 129, C. I. Pigment Yellow 138, C. I. Pigment Yellow 139, Pigment Yellow 150, C. I. Pigment Yellow 151, C. I. Pigment Yellow 152, C. I. Pigment Yellow 153, C. I. Pigment Yellow 154, C. I. Pigment Yellow 155, C. I. Pigment Yellow 156, C. I. Pigment Yellow 166, C. I. Pigment Yellow 168, C. I. Pigment Yellow 175;

C. I. Pigment orange 1, C. I. Pigment orange 5, C. I. Pigment orange 13, C. I. Pigment orange 14, C. I. Pigment orange 16, C. I. Pigment orange 17, C. I. Pigment orange 24, C. I. Pigment orange 34, C. I. Pigment orange 36, C. I. Pigment orange 38, C. I. Pigment orange 40, C. I. Pigment orange 43, C. I. Pigment orange 46, C. I. Pigment orange 49, C. I. Pigment orange 51, C. I. Pigment orange 61, C. I. Pigment orange 63, C. I. Pigment orange 64, C. I. Pigment orange 71, C. I. Pigment orange 73;

C. I. Pigment violet 1, C. I. Pigment violet 19, C. I. Pigment violet 23, C. I. Pigment violet 29, C. I. Pigment violet 32, C. I. Pigment violet 36, C. I. Pigment violet 38;

C. I. Pigment red 1, C. I. Pigment red 2, C. I. Pigment red 3, C. I. Pigment red 4, C. I. Pigment red 5, C. I. Pigment red 6, C. I. Pigment red 7, C. I. Pigment red 8, C. I. Pigment red 9, C. I. Pigment red 10, C. I. Pigment red 11, C. I. Pigment red 12, C. I. Pigment red 14, C. I. Pigment red 15, C. I. Pigment red 16, C. I. Pigment red 17, C. I. Pigment red 18, C. I. Pigment red 19, C. I. Pigment red 21, C. I. Pigment red 22, C. I. Pigment red 23, C. I. Pigment red 30, C. I. Pigment red 31, C. I. Pigment red 32, C. I. Pigment red 37, C. I. Pigment red 38, C. I. Pigment red 40, C. I. Pigment red 41, C. I. Pigment red 42, C. I. Pigment red 48:1, C. I. Pigment red 48:2, C. I. Pigment red 48:3, C. I. Pigment red 48:4, C. I. Pigment red 49:1, C. I. Pigment red 49:2, C. I. Pigment red 50:1, C. I. Pigment red 52:1, C. I. Pigment red 53:1, C. I. Pigment red 57, C. I. Pigment red 57:1, C. I. Pigment red 57:2, C. I. Pigment red 58:2, C. I. Pigment red 58:4, C. I. Pigment red 60:1, C. I. Pigment red 63:1, C. I. Pigment red 63:2, C. I. Pigment red 64:1, C. I. Pigment red 81:1, C. I. Pigment red 83, C. I. Pigment red 88, C. I. Pigment red 90, C. I. Pigment red 97, C. I. Pigment red 101, C. I. Pigment red 102, C. I. Pigment red 104, C. I. Pigment red 105, C. I. Pigment red 106, C. I. Pigment red 108, C. I. Pigment red 112, C. I. Pigment red 113, C. I. Pigment red 114, C. I. Pigment red 122, C. I. Pigment red 123, C. I. Pigment red 144, C. I. Pigment red 146, C. I. Pigment red 149, C. I. Pigment red 150, C. I. Pigment red 151, C. I. Pigment red 166, C. I. Pigment red 168, C. I. Pigment red 170, C. I. Pigment red 171, C. I. Pigment red 172, C. I. Pigment red 174, C. I. Pigment red 175, C. I. Pigment red 176, C. I. Pigment red 177, C. I. Pigment red 178, C. I. Pigment red 179, C. I. Pigment red 180, C. I. Pigment red 185, C. I. Pigment red 187, C. I. Pigment red 188, C. I. Pigment red 190, C. I. Pigment red 193, C. I. Pigment red 194, C. I. Pigment red 202, C. I. Pigment red 206, C. I. Pigment red 207, C. I. Pigment red 208, C. I. Pigment red 209, C. I. Pigment red 215, C. I. Pigment red 216, C. I. Pigment red 220, C. I. Pigment red 224, C. I. Pigment red 226, C. I. Pigment red 242, C. I. Pigment red 243, C. I. Pigment red 245, C. I. Pigment red 254, C. I. Pigment red 255, C. I. Pigment red 264, C. I. Pigment red 265;

C. I. Pigment blue 15, C. I. Pigment blue 15:3, C. I. Pigment blue 15:4, C. I. Pigment blue 15:6, C. I. Pigment blue 60;

C. I. Pigment green 7, C. I. Pigment green 36;

C. I. Pigment brown 23, C. I. Pigment brown 25; and,

C. I. Pigment black 1, C. I. Pigment black 7.

Further as concrete examples of the inorganic pigments or the extender pigments, there may be exemplified titanium oxide, barium sulfate, calcium carbonate, zinc white, lead sulfate, yellow lead, zinc yellow, iron oxide red (red iron oxide (III)), cadmium red, ultra marine, prussian blue, chromium oxide green, cobalt green, amber, titanium black, synthetic iron black, carbon black or the like. In the present invention, the pigment may be used solely or in combination of two or more pigments.

In a case where the ink composition of the present invention is used to form a light shielding layer with a certain pattern, a black pigment superior in the light shielding property is contained in the ink composition. As the black pigment superior in the light shielding property, it is preferable to use inorganic coloring agents such as carbon black, tri-iron (iv) tetroxide or the like, or organic coloring agents such as cyanine black or the like (The Other Component)

One or two or tore kinds of the other additives may be contained as required in the ink-jet ink composition of the present invention. As the other additives, there may be the followings.

(i) Dispersing Agent

In a case of incorporating the pigment in the ink composition, a dispersing agent may be used in the ink composition as required in order to disperse the pigment in a good condition. As the dispersing agent, it is possible to use, for example, a cationic, an anionic, a nonionic, an amphoteric, a silicone based, and a fluorine based dispersing agent or the like. Among the dispersing agent, polymer type surface active agents (polymer type dispersing agents) exemplified below are preferable.

That is: polyoxy ethylene alkyl ethers such as polyoxy ethylene lauryl ether, polyoxy ethylene stearyl ether, polyoxy ethylene oleyl ether or the like; polyoxy ethylene alkyl phenyl ethers such as polyoxy ethylene octyl phenyl ether, polyoxy ethylene nonyl phenyl ether or the like; polyethylene glycol diesters such as polyethylene glycol dilaurate, polyethylene glycol distearate or the like; sorbitan fatty acid esters; fatty acid modified polyesters; tertiary amine modified polyurethanes or the like.

(ii) Dispersing Assistance Agent

For example, a blue pigment derivatives such as copper phthalocyanine derivatives, a yellow pigment derivatives or the like.

(iii) Filler

For example, a glass, an alumina or the like.

(iv) Adhesion Enhancing Agent

For example, vinyl trimethoxy silane, vinyl triethoxy silane, vinyl tris(2-methoxyethoxy) silane, N-(2-aminoethyl)-3-aminopropyl methyl dimethoxy silane or the like.

(v) Antioxidant

For example, 2,2'-thio-bis (4-methyl-6-t-butylphenol), 2,6-di-t-butylphenol or the like.

(vi) Ultraviolet Ray Absorbent

For example, 2-(3-t-butyl-5-methyl-2-hydroxyphenyl)-5-chlorobenzotriazole, alkoxyl benzophenone or the like.

(vii) Aggregation Inhibitor

For example, sodium polyacrylic acid, various kinds of the surface active agent or the like.

(viii) Leveling Agent

For example, silicone based, polyalkylene ether based, fatty acid ester based, and special acrylic polymers available from the market respectively or the like.

(Composition Ratio of Solid Component)

An composition ratio of the each material mentioned above is determined in order to design the ink composition having both of the performance required with respect to the color filter and the performance required with respect to the ink-jet ink.

In terms of weight ratio, an composition ratio of the main polymer (A'), the carboxyl group block compound (B) and the multifunctional epoxy resin (C) combined as required is:

Preferably in a range of 10 to 80 parts by weight of the main polymer (A'), 10 to 60 parts by weight of the carboxyl group block compound (B) and 10 to 60 parts by weight of the multifunctional epoxy resin (C);

More preferably in a range of 20 to 60 parts by weight of the main polymer (A'), 20 to 50 parts by weight of the carboxyl group block compound (B) and 20 to 50 parts by weight of the multifunctional epoxy resin (C); and, Most preferably in a range of 30 to 40 parts by weight of the main polymer (A'), 35 to 45 parts by weight of the carboxyl group block compound (B) and 25 to 35 parts by weight of the multifunctional epoxy resin (C).

In a case of adjusting the composition ratio further accurately in order to obtain a sufficient cross-linking density, it is preferable to adjust the equivalent ratio of the functional group represented by the formula 1a or 1b contained in the carboxyl group block compound (B) and the total epoxy group contained in the main polymer (A') and the multifunctional epoxy resin (C) (reaction equivalence of the functional group of the formula 1a or 1b/reaction equivalence of the epoxy group) in a range of 0.2 to 2.0, and more preferable to adjust the same in a range of 0.5 to 1.2. When this equivalent ratio is less than 0.2, a reaction speed is slow, and an extent of the curing may be insufficient. On the other hand, when this equivalent ratio is over 2.0, a residual amount of the epoxy group becomes too small, and adhesion of the coating may be remarkably decreased.

In order to provide a sufficient adhesion, strength and hardness for the cured resin layer, it is possible that a sum composition ratio of the main polymer (A'), the carboxyl group block compound (B) and the multifunctional epoxy resin (C) is adjusted to 50% by weight or more with respect to the total amount of all solid components in the ink composition including the pigment and the other components. It is to be noted that the solid component of the ink composition which is the basis for defining the composition ratio includes all ingredients only except the solvent, and the multifunctional epoxy resin in a liquid state or the like are also included therein.

The thermal potential catalyst (D) is usually combined at an amount in a range of about 0.01 to 10.0 parts by weight with respect to 100 parts by weight of amount summing the main polymer (A'), the carboxyl group block compound (B) and the multifunctional epoxy resin (C).

In a case of incorporating the pigment into the ink composition, a composition ratio of the pigment is usually in a range of about 10 to 40% by weight, and preferably in a range of about 20 to 30% by weight with respect to the total amount of the solid components in the ink composition. If the pigment is small amount, a coating layer formed by coating the ink composition at a predetermined thickness (usually 0.1-2.0 µm) may not obtain a transmitted light having required color, sufficient deepness (color density) and sufficient brightness. On the other hand, if the pigment is large amount, the composition ratio of major components (A), (B) and (C) of the binder system relatively becomes small amount, and physical properties of the coating layer are liable to be insufficient.

(Solvent)

A solvent (E) may be incorporated with the ink-jet ink composition for a color filter of the present invention as required in order to prepare the ink composition as a liquid with high concentration or an ink in a state capable of being ejected from the recording head as it is.

Since the ink-jet ink composition for a color filter of the present invention is excellent in the storage stability (the viscosity stability) of the binder system, the ejecting performance from the recording head of the ink jet method is excellent. For the purpose of further improving its ejecting performance, it is preferable to use, as a main solvent, a solvent which has a 180° C. to 260° C. boiling point, particularly a 210° C. to 260° C. boiling point and a 133 Pa (0.5 mmHg) or less vapor pressure, particularly a 26.6 Pa (0.1 mmHg) or less vapor pressure at an ordinary temperature (in particular, 18° C. to 25° C.), and such a main solvent is preferably incorporated at a ratio of 80% by weight or more, particularly 85% by weight or more with respect to the total amount of the solvent (E).

The solvent component with a 180° C. to 260° C. boiling point and a 133 Pa (0.5 mmHg) or less vapor pressure at an ordinary temperature has proper drying and vaporizing properties. Accordingly, if a simple or mixed solvent containing such a solvent component with a high composition ratio is used, the ink is not rapidly dried at a nozzle end of the recording head, so that rapid viscosity rise of the ink or choking of the recording head is not caused, thus avoiding a bad influence on the straightness and sustainability of the ejection. In addition, since a drying of the ink using such a solvent proceeds at a proper speed after shooting it on a surface to be subjected to the coating operation (a coating receptive surface), the ink fits on the coating receptive surface to make a surface of the coating layer even and smooth, and then the ink can be rapidly and completely dried by an air drying or an ordinary heating operation. When such a solvent is used, a risk is small in remaining of the solvent in the coating layer after the drying operation in comparison with the case using a wetting agent or a solvent with a very high boiling point.

In many case of using the pigment as the coloring agent for the ink composition of the present invention, the pigment is endowed dispersibility in advance by mixing it with a dispersing agent in a solvent which is a part of the whole amount of the solvent to be used, and the thus obtained pigment dispersion (i.e., a pigment dispersion with a high concentration) is incorporated into a remainder solvent together with the other compositional ingredients and mixed, thereby making the ink composition. In order to the pigment dispersion, it is necessary to use a solvent easily dispersing the pigment such as 3-methoxybutyl acetate, propylene glycol monomethyl ether acetate (PGMEA) or the like.

A solvent component other than the main solvent such as a dispersing solvent for preparing the pigment dispersion may be contained in the solvent (E) of the ink composition as required if it is a small amount. However, even in such a case, it is necessary to use the main solvent with the above-mentioned boiling point and vapor pressure at a ratio of 80% by weight or more with respect to the total amount of the solvent (E). If the ratio of the main solvent is less than 80% by weight of the whole solvent, it is difficult to securely obtain the drying and vaporizing properties suitable for the ink-jet method.

The main solvent is desirable to be used at the highest composition ratio possible, and more specifically it is preferable to be 80% by weight or more, more preferable to be 85% by weight or more, and most preferable to be as close to 100% by weight as possible. Accordingly, it is preferable that the main solvent is appropriately selected so as to be used by mixing with the dispersing solvent, or used as it is as the dispersing solvent, at the time when preparing the pigment dispersion.

In a case where an inkphilic region with an ink affinity is formed on a portion of a substrate where an ink layer is desired to be formed by forming a wettability-variable layer on a surface of a substrate and subjecting it to an exposing operation, and then the ink composition of the present invention is made to selectively adhere to the inkphilic region by the ink jet method, it is preferable to select and use, as the main solvent, a solvent with a 25° or more contact angle, particularly 30° or more contact angle with respect to the surface of a test piece with a 30 mN/m critical surface tension found in a Zisman plotting graph using a standard liquid specified in the wettability test defined in the JIS-K6768, and measuring the contact angle (θ) 30 seconds later from contact with liquid droplets, and a 10° or less contact angle with respect to the surface of a test piece with a 70 mN/m critical surface tension found in the same measurement method.

When the ink composition is prepared with the use of the solvent exhibiting the above-mentioned behavior in the wettability, the ink composition exhibits a large ink-repellent property with respect to a surface of the wettability-variable layer before changing wettability of the wettability-variable layer, and it exhibits a large affinity with respect to a surface of the wettability-variable layer after changing wettability of the wettability-variable layer in the direction of enlarging the hydrophilicity. Therefore, the great difference can be made between a wettability of the ink composition with respect to the inkphilic region which is formed by selectively exposing a portion of the surface of the wettability-variable layer to the light and a wettability of the same with respect to a repellent region which is surrounding the inkphilic region, and then the ink composition shot on the inkphilic region by the ink jet method becomes to entirely spread to this region and uniformly wet this region. As a result, an ink layer with a minute and precise pattern can be formed by the ink jet method.

In the present invention, any material is allowed to form the test piece having the above mentioned properties in the surface tension. As the test piece with a 30 mN/m critical surface tension, one meeting this requirement can be picked up from among, for example, polymethyl methacrylate, polyvinyl chloride, polyvinylidene chloride and polyethylene terephthalate having a smooth surface respectivery, one produced by coating any one of the above polymers, a surface modifying agent or the like on a smooth surface of the glass or the like, by practically carrying out the above mentioned test. Further, as the test piece with a 70 mN/m critical surface tension, it can be picked up from among, for example, nylon, one produced by subjecting a surface of glass to the hydrophilic treatment or the like, by practically carrying out the above mentioned test.

The main solvent can be used by selecting from among such solvents as mentioned below: glycol ethers such as ethylene glycol monoethyl ether; glycol ether esters such as ethylene glycol monomethyl ether acetate; glycol oligomer ethers such as diethylene glycol monomethyl ether; glycol oligomer ether esters such as diethylene glycol monomethyl ether acetate; aliphatic carboxylic acids or anhydride thereof such as acetic acid, 2-ethylhexanoic acid or acetic acid anhydride; aliphatic or aromatic esters such as ethyl acetate or propyl benzoate; dicarboxylic acid diesters such as diethyl carbonate; alkoxycarboxylic acid esters such as methyl 3-methoxy propionate; ketocarboxylic acid esters such as ethyl acetoacetate; halogenocarboxylic acids such as chloroacetic acid or dichloroacetic acid; alcohols or phenols such as ethanol, isopropanol or phenol; aliphatic or aromatic ethers such as diethyl ether or anisole; alkoxyalcohols such as 2-ethoxyethanol and 1-methoxy-2-propanol; glycol oligomers such as diethylene glycol or tripropylene glycol; amino alcohols such as 2-diethyl amino ethanol or triethanol amine; alkoxyalcohol esters such as 2-ethoxy ethyl acetate; ketones such as acetone or methyl isobutyl ketone; morpholines such as N-ethylmorpholine or phenyl morpholine; aliphatic or aromatic amines such as pentyl amine, tripentyl amine on aniline; or the like.

As the solvent (E), in particular the main solvent almost occupying the solvent (E), it is preferable to use a solvent not containing a hydroxyl group in its molecule. If the solvent contains the hydroxyl group, the dispersibility and the dispersing stability of the pigment are inferior, and in addition, since the carboxyl group block compound (B) is promoted in dissociation of the blocking agent and becomes liable to generate the carboxyl group, it is capable of reacting with the epoxy group contained in the epoxy compound (A) and the multifunctional epoxy resin (C) before the heating operation to deteriorate the storage stability (the viscosity stability).

Therefore the use of the solvent not containing a hydroxyl group as the solvent (E) further improves the viscosity stability of the ink composition, thereby obtaining an ink excellent in the ejecting performance and the storage stability.

Preferable examples of the main solvent include ethylene glycol monobutyl ether acetate, diethylene glycol monobutyl ether acetate, diethylene glycol monoethyl ether acetate, diethylene glycol dibutyl ether, diethyl adipate, dibutyl oxalate, dimethyl malonate, diethyl malonate, dimethyl succinate, diethyl succinate or the like. Since these solvents satisfy the requirements not only to have a 180° C. to 260° C. boiling point and a 133 Pa (0.5 mmHg) or less vapor pressure at an ordinary temperature, but also to have no hydroxyl group in its molecule, the above-mentioned problems are not caused. Further these solvents can be used in combination by mixing it with a solvent which has been conventionally used for preparing the pigment dispersion, such as 3-methoxybutyl acetate or propylene glycol monomethyl ether acetate (PG-MEA), or used as it is as a dispersing solvent by mixing with no other solvent, thereby preparing the pigment dispersion.

The above-mentioned solvents of the preferable example also satisfy the requirement that to have a 25° or more contact angle with respect to the surface of a test piece with a 30 mN/m critical surface tension found in a Zisman plotting graph using a standard liquid specified in the wettability test defined in the JIS-K6768, and measuring the contact angle (θ) 30 seconds later from contact with liquid droplets, and a 10° or less contact angle with respect to the surface of a test piece with a 70 mN/m critical surface tension found in the same measurement method.

Accordingly, in a case where the wettability-variable layer is provided on the substrate surface and subjected to the exposure, and then the ink composition is made to selectively adhere thereto by utilizing the difference in the wettability between the exposed and the unexposed portions, these solvents can be preferably used as the main solvent as well.

If the moisture is immixed in the solvent, it means that the hydroxyl group of the water molecule is present in the solvent, and the same problem as in the case of using the solvent with the hydroxyl group may be caused. Therefore it is preferable that a coating liquid is prepared with the use of a solvent with a low miscibility with the water in order to substantially exclude the moisture from the crosslinking reaction between the acid and the epoxy. In this view, preferable solubility of the solvent for preparing the ink composition with respect to the water is 20 parts by weight or less with respect to 100 parts by weight of water at 20° C. of liquid temperature, when defining it in terms of weight ratio.

Among the above-mentioned concrete examples of the main solvent, diethylene glycol monobutyl ether acetate is particularly preferable, because it has no hydroxyl group and a low miscibility to the water in extent of 6.5 parts by weight dissolvable with respect to 100 parts by weight of water with 20° C. of liquid temperature.

The solvent (E) is usually used at a ratio of 40 to 95% by weight with respect to the total amount of the ink composition including the solvent itself to prepare the ink composition. If an amount of the solvent is excessively small, a viscosity of the ink is high and the ejecting operation from the ink-jet head is difficult. Of the other hand, if an amount of the solvent is excessively large, a liquid film deposited on a predetermined wettability changeable portion (an ink layer forming portion) is broken when a heaping level (a deposited amount) of the ink is not enough yet to overrun to the surrounding unexposed portion, and it may be further wetly spreads to an adjacent wettability changeable portion (an ink layer forming portion). In other word, a heaping amount of the ink capable of being deposited, with no overrunning, on the wettability changeable portion (an ink layer forming portion) which is defined as an area where the ink must adhere becomes insufficient, and a layer thickness after dried becomes excessively thin, thereby not obtaining a transmitted light having sufficient color density and brightness.

(Production Method of Ink Composition)

In a case where the ink-jet ink composition of the present invention does not contain the pigment, it can usually be produced by dissolving and dispersing each ingredient such as the epoxy compound (A) or the like in an appropriately selected solvent in an optional order. It is to be noted that if a temperature of the solvent is too high, a protecting group is dissociated from the carboxyl group block compound (B) to already reproduce the carboxyl group at a stage of preparing the ink composition. Therefore the temperature of the solvent is controlled in a range where the carboxyl group of the carboxyl group block compound (B) is not reproduced, and normally at 50° C. or less, and preferably in a range of about 20° C. to 30° C.

In the present invention, the polycarboxylic acid which is refractory in solubility is first modified in a form of the carboxyl group block compound (B) with a high solubility by blocking (capping or protecting) the carboxyl group of the polycarboxylic acid, and then it is dissolved or dispersed in the solvent. Therefore reaction points of the carboxyl group can be made to coexist at a high concentration with the epoxy group in the ink composition, and a high density of crosslinking can be obtained by forming an ink layer with the use of such an ink composition and drying the same.

In addition, the carboxyl group block compound (B) does not reproduce the carboxyl group insofar as it is not heated to or over a specific temperature which is determined in accordance with itself. Therefore, even though each of the reaction point concentrations of the epoxy group and the carboxyl group contained in the ink composition is high, viscosity rise can hardly be generated during the ejecting operation from the recording head of the ink-jet method so that the excellent straightness of the ejecting direction from the ink-jet head and sustainability of drop mass magnitude can be provided as well as a preferable viscosity can be maintained from immediately after preparation over a long term in the state of the ink composition so that the excellent storage stability can be provided as well.

In the preferable example of the ink-jet ink composition for a color filter of the present invention, it has an initial viscosity in a range of 0.1 to 100 cps immediately after preparation, and can restrain the viscosity rise, which is caused by storing the ink composition in a chest immediately after preparation and leaving it at 20° C. for 40 days, up to 10% or less of the initial viscosity.

In the case of directly introducing the pigment into the entire solvent together with the other components such as the binder component, agitating and mixing, the pigment cannot be dispersed sufficiently in the solvent in many cases. Therefore, in the case of providing a pigment in the ink-jet ink composition for a color filter of the present invention, in general, a solvent with good dispersing property and dispersing stability to the pigment is used, and the pigment is introduced therein together with a dispersing agent and sufficiently agitated by means of a dissolver or the like, thereby preparing a pigment dispersion. Then, the obtained pigment dispersion is introduced into a solvent containing mostly a main solvent or only a main solvent together with the components other than the pigment and agitated and mixed by means of a dissolver or the like, thus obtaining an ink composition of the present invention.

As a remainder solvent into which the pigment dispersion is to be introduced, it may be possible to use a solvent composition defined by subtracting a portion corresponding a solvent used for preparation of the pigment dispersion from the whole solvent composition to be finally desired and complete the ink composition diluted to a final concentration. Alternatively it may be possible to prepare an ink composition with a high concentration by introducing the pigment dispersion into a relatively small amount of the main solvent. The ink composition with a high concentration can be stored as it is and applied to the ink jet method by diluting to the final concentration just before using it.

In the present invention, it is preferable to use a simple or a mixed solvent which contains, as a main solvent, a solvent component having a 180° C. to 260° C. boiling point and a 133 Pa (0.5 mmHg) or less vapor pressure at an ordinary temperature (in particular, one containing no hydroxyl group) by a 80% by weight or more ratio with respect to the total amount of the whole solvent. However, in order to adjust a final concentration of the main solvent to 80% by weight or more of the whole solvent, a conventionally used dispersing solvent such as 3-methoxybutyl acetate or propylene glycol monomethyl ether acetate (PGMEA) may be restricted so as not to be used at a sufficient amount when preparing the pigment dispersion.

In such a case, a mixture solvent which is prepared by selecting a solvent having relatively good dispersibility and dispersing stability for the pigment from among those usable as the main solvent, and mixing the same with a conventionally used dispersing solvent is used as a dispersing solvent for the present invention. Alternatively such main solvent as having a relatively good dispersibility for the pigment is used as it is as a dispersing solvent for the present invention.

(Production Method of Color Filter)

The ink-jet ink composition for a color filter of the present invention is made to selectively adhere to a predetermined area on a transparent substrate of the color filter by the ink jet method to form an ink layer with a predetermined pattern, and thereafter the ink layer is heated to cured, thereby forming a cured resin layer as a detail portion of the color filter such as an pixel part, a black matrix layer, a pillar-like spacer, a protect layer or the like.

(1) First Method

The following is one example of a production method for a color filter using an ink for forming the pixel part containing the pigment, as the ink-jet ink composition for a color filter of the present invention.

Figure 4A:
FIG. 4 is a view explaining a production method for a color filter using an ink composition according to the present invention.

First, as shown in FIG. 4A, a transparent substrate 15 of the color filter is taken. As this transparent substrate, substrates which have hitherto been used for a color filter can be used, without limitation, such as a transparent rigid material having no flexibility such as quartz glass, Pyrex (trade name) glass, synthetic quartz glass and the like, or a transparent flexible material having the flexibility such as a transparent resin film, a resin plate for optics and the like. Among them, 7059 glass in the trade name produced by Corning Co., Ltd. is a material having the small thermal expansion coefficient and is excellent in the dimensional stability and the workability at heat-treatment at an elevated temperature and, additionally, since it is non-alkali glass containing no alkaline component in a glass, it is suitable for a color filter for a color liquid crystal display apparatus by an active matrix system. In the present invention, a transparent material is usually used for a transparent substrate and a reflective substrate and white-colored substrate may be used. Alternatively, as a substrate, substrates having the surface treated for preventing the alkali dissolution or for imparting the gas barrier properties or for other objects may be used.

Figure 4B:

Next, as shown in FIG. 4B, a black matrix layer 16 is formed on one side of the transparent substrate 15 so as to be disposed in an area to be a border part between the each pixel part.

It is possible to form the black matrix layer 16 by forming a metal layer of chromium or the like having the thickness of around 1000 to 2000 Å by a sputtering method, a vacuum metallizing method or the like, and patterning this metal layer. As this patterning method, the conventional patterning method such as sputtering and the like can be used.

Alternatively, the black matrix layer may be a layer containing a shading particle such as a carbon fine particle, a metal oxide, an inorganic pigment, an organic pigment, and the like in a resin binder. As a resin binder used, alone or a mixture of two or more of a polyimide resin, an acrylic resin, an epoxy resin, polyacrylamide, polyvinyl alcohol, gelatin, casein, cellulose and the like, a photosensitive resin, an O/W emulsion-type resin composition, for example, an emulsified reactive silicone can be used. The thickness of such the resin black matrix layer can be set in a range of 0.5 to 10 µm. As a method of patterning such the resin black matrix layer, methods which are generally used such as a photolithography method and a printing method can be used.

Figure 4C:
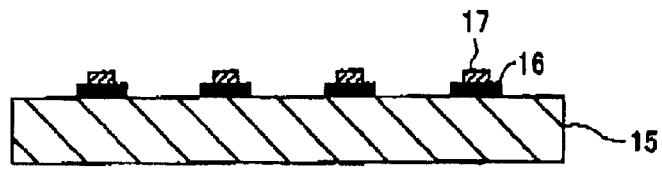

Next, as shown in FIG. 4C, an ink-repellent convex part 17 having the narrower width than that of the black matrix layer is formed, as required, on a center portion in a width direction of the pattern of the black matrix layer. The composition of such the ink-repellent convex part is not particularly limited as long as it is a resin composition having the ink-repellent properties. In addition, the composition is not necessarily transparent and may be colored. For example, a material which is used for a black matrix layer and which is a material with no black material incorporated therein can be used. More particularly, mention may be made of a composition of a water soluble resin such as polyacrylamide, polyvinyl alcohol, gelatin, casein, cellulose and the like alone or a mixture of two or more of them, and a resin composition such as O/W emulsion, for example, an emulsified reactive silicone. In the present invention, a photocuring resin is suitable used for the reasons of easy handling and curing. In addition, since this ink-repellent convex part is preferable as it grows ink-repellent, the surface thereof maybe treated with an ink-repellent treating agent such as a silicone compound and a fluorine-containing compound.

A patterning operation of the ink-repellent convex part can be carried out by the printing method using a coating liquid of the ink-repellent resin composition, or by the photolithography using a photocurable coating liquid.

An ink-repellent convex part is preferably relatively higher because it is provided for preventing an ink from mixing upon coloring with an ink jet method but, in view of the flatness of the whole when it is made into a color filter, the thickness near that of the pixel part is preferable. More particularly, a preferable range is usually from 0.1 to 2 µm although it is different depending upon an accumulated amount of an ink shot.

Figure 4D:
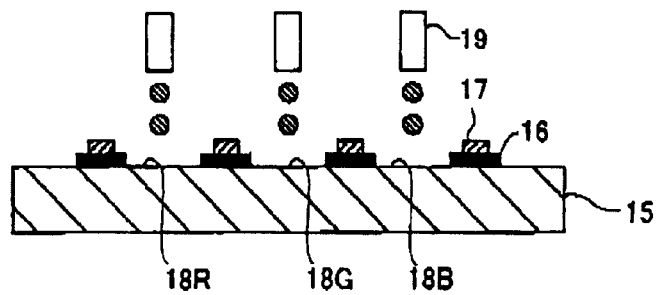

Next, an ink composition of the present invention for forming the pixel part of each color which contains a pigment of R, G or B is taken. Then, as shown in FIG. 4D, an ink layer is formed by shooting the ink for forming the pixel part of each color, through the ink jet method, to a pixel part forming area of corresponding color 18R, 18G or 18B which is defined on a surface of the transparent substrate 15 by the pattern of the black matrix layer 16. The ink layer has a red pattern, a green pattern and a blue pattern disposed in a desired form, such as the mosaic type, the stripe type, the triangular type and the four pixel arrangement type.

In this operation shooting the ink, the ink for forming the pixel part hardly generates the viscosity rise at a nozzle end of the recording head 19 and it keeps a good ejecting performance. Accordingly an ink with a desired color can be made to precisely and uniformly adhere to a predetermined pixel part forming area, thereby forming a pixel part with a precise pattern and without color non-uniformity and color missing. In addition, since an ink for forming the pixel part of each color can be shot on a surface of the substrate at the same time by means of plural heads, the operating efficiency can be improved in comparison with a case of a method forming the pixel part by every color such as a printing method or the like. Further, since the ink composition of the present invention has an improved stability as mentioned above, the rest of the ink composition left after subjecting it to the first use is not deteriorated yet if a working time is short. Therefore it is possible to reuse such a rest of the liquid by recovering it or additionally pouring a fresh ink composition into there, thus economical.

Figure 4E:
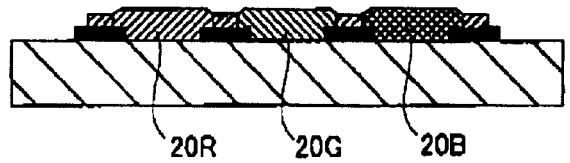

Next, as shown in FIG. 4E, an ink layer 20R, 20G or 20B of each color is solidified by drying, and thereafter cured by heating. When the ink layer is heated, the protect group is dissociated from the above-mentioned carboxyl group block compound (B) contained in the ink layer to reproduce the carboxyl group from the functional group represented by the formula 1, and the reproduced carboxyl group causes a crosslinking reaction with the epoxy group contained in the epoxy compound (A) and the multifunctional epoxy resin (C), thereby curing the ink layer. Thickness of the pixel part is normally set in a range of about 0.1 to 2.0 µm in consideration of optical properties or the like.

In this drying and thermosetting operation, a coating layer is normally dried and solidified by a prebake heating, and thereafter thermally cured by a postbake heating with a temperature raised higher than that in the prebaking stage. However there may be already started a part of the thermosetting reaction at the prebaking stage, in a case where a heating temperature of prebaking is relatively high, or a case where a dissociating temperature of the carboxyl group block compound (B) is relatively low.

In the present invention, it is preferable to carry out the prebaking at as higher temperature as possible provided that an upper limit of temperature is set within an extent that the thermosetting reaction does not start or hardly proceeds even if the reaction is partly started. When the prebaking is carried at a high temperature, the productivity is enhanced by shortening the time to spend for the drying operation, and in addition a cured coating layer with an uniform thickness is obtained, and even it a substrate surface has a convex-concave configuration, a cured coating layer with a highly even surface is obtained.

Figure 6:
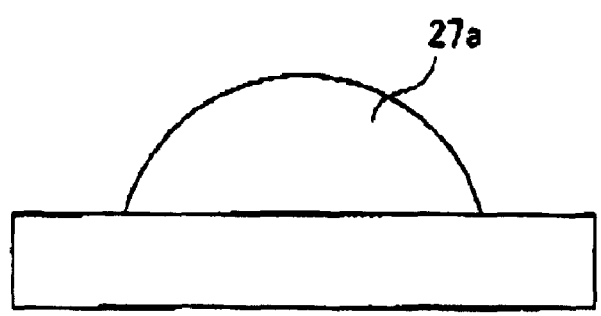
FIG. 6 is a sectional view showing a shape of a cured coating layer formed in a case of a low prebaking temperature.

That is, when the ink composition of the present invention is shot to a coating receptive surface by the ink jet method, a coating layer still in a fluid state takes a convex form in which a center portion is heaped as shown in FIG. 6 by surface tension, and it is solidified as it is by drying, thus forming a cured coating layer 27a keeping the convex form even after the thermosetting operation.

The curing process keeping the convex form at the shooting operation causes a non-uniformity of layer thickness and a deficient color density and brightness at a peripheral portion of the coating layer in a case of forming a coloring layer such as the pixel or the like, thus resulting into the color non-uniformity (namely, the chrominance between the peripheral and the center portions of the coating layer). Further the curing process keeping the same convex form disturbs absorption of the convex-concave configuration on the base surface in a case of forming a coating layer with a relatively large area such as the protect layer or the like, thus resulting into the inferior performance of the surface evening.

Figure 7:
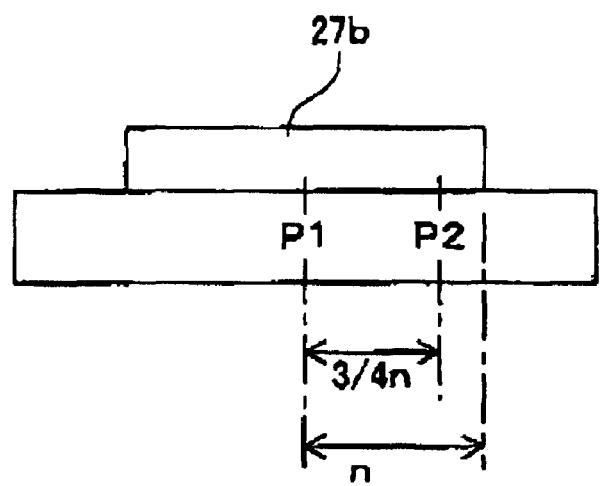
FIG. 7 is a sectional view showing a shape of a cured coating layer formed in a case of a high prebaking temperature.

In contrast, if the coating layer having the convex form is dried at a high temperature at the prebaking stage while the coating layer is still remaining in a highly fluid state, an evaporation speed of the solvent, namely a drying rate becomes very fast at a peripheral portion where a layer thickness is small of the coating layer in comparison with a center portion of the same where a layer thickness is relatively large. A large concentration gradient is formed by this acceleration in the drying process at the peripheral portion, and an amount of a solvent moving toward the peripheral portion is increased. Then an amount of a solute moving toward the peripheral portion is also increased depending on the solvent movement with the result that a thickness at the peripheral portion of the coating layer is increased. Therefore such a prebaking operation with a high temperature enables to make a thickness of the coating layer uniform and a surface of the coating layer even, and a thermal curing of the coating layer through a subsequent postbaking operation provides a cured coating layer which has an uniform thickness and a highly even surface as shown in FIG. 7.

However, when a heating temperature at the prebaking stage is excessively high, the coating layer becomes liable to be cracked, thus causing a new problem. That is, since a drying speed becomes excessively high if carrying out the prebake at a high temperature, the reduction of layer thickness (or the volume reduction of the coating layer) drastically progresses to promote the cracking. In particular, if the coating layer is formed with the use of the ink composition containing a carboxyl group block compound (B) with a low dissociation temperature of the vinyl ether and subjected to the prebaking at a high temperature, the thickness reduction (or the volume reduction) of coating layer drastically progresses as mentioned above, and at the same time, a temperature of the coating layer reaches the dissociation temperature of the vinyl ether during the prebaking stage to coincidentally progress the thermosetting reaction of the epoxy compound. Accordingly stress or distortion becomes further increased inside the coating layer, thus being more liable to generate the cracking.

Such a problem of the crack can be prevented by the use of the main polymer (A') with 70° C. or less of Tg or the use of the carboxyl group block compound (B) with the primary alkyl vinyl ether as mentioned above, and more preferably by the both use. It is presumed that, even if the coating layer is dried at a high temperature at the above-mentioned prebaking stage, the coating layer can keep flexibility capable of absorbing a stress or distortion generated its inside in such manner.

According to experiments of the present inventors, in a case where a coating layer was dried by heating at about 80° C. at a prebaking stage, the cracking was not generated, but a cured coating layer 27a with a convex form as shown in FIG. 6 was obtained. Then, when the obtained cured coating layer was a pixel, the color density of its peripheral portion was small and the chrominance with respect to the center portion was large. In addition, in a case where the coating layer was heated at around 100° C. or more at the prebaking stage, the cracking was liable to be generated.

In contrast with this, when the ink composition containing the above-mentioned main polymer (A') with 70° C. or less of Tg or the above-mentioned carboxyl group block compound (B) with the primary alkyl vinyl ether, and more preferably containing both of them was shot to a coating receptive surface by the ink jet method, the coating layer did not cause the cracking though it was heated and dried at about 100° C. or more at the prebaking stage. Further the cured coating layer 27b finally obtained was highly even, as shown in FIG. 7, and in a case where a cured coating layer was the pixel, the chrominance ΔEab of a position "P2" with respect to a center "P1" wherein the position P2 was distant from the center P1 of the coating layer toward the periphery of the same by three quarters of a width "n" which is a distance between the center P1 and the end portion, could be controlled at 6 or less, and more preferably 3 or less, and thus a color non-uniformity was not observed by naked eyes.

In order to further improve the evenness of the coating layer, it was effective to raise a heating temperature (a temperature of the coating layer) at about 120° C. or more, more preferably 140° C. or more at the prebaking stage. Further, to heat under the decompression condition was also effective on improvement in the evenness and shortening of the drying time. However, when a heating temperature rose over about 160° C. at the prebaking stage, the coating layer still not dried became liable to cause bumping.

According to these experiments, there was found the fact that, in order to obtain a coating layer with an uniform thickness or an even surface for the present invention, it is preferable to carry out the prebaking by heating the coating layer of the ink composition at 100° C. or more, more preferably 120° C. or more, and still further preferably 140° C. or more provided that the blocking portion does not dissociate from the carboxyl group block compound (B), while restricting the heating temperature to 160° C. or less so as to prevent the bumping, and it is further preferable to carry out drying under reduced pressure at the same time. After prebaking, the postbaking is then carried out by raising a heating temperature over a dissociation temperature of the carboxyl group block compound, for example, raising to 200° C. for one hour, thus obtaining a cured coating layer with a high uniformity or evenness.

In a case of carrying out the above-mentioned prebaking of a high temperature and the postbaking, the cracking can be prevented by the use of the ink composition containing either the main polymer (A') with 70° C. or less of Tg or the carboxyl group block compound (B) with the primary alkyl vinyl ether, and preferably containing both of them, thereby obtaining the coating layer with a high uniformity or evenness and no cracks.

Figure 4F:
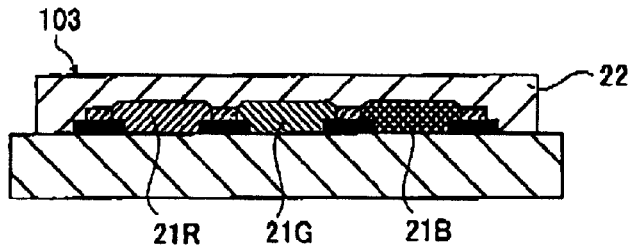

Next, as shown in FIG. 4F, a protect layer 22 is formed on a side on which the pixel part 21R, 21G and 21B is disposed of the transparent substrate. The thickness of a protect layer can be set in view of the light transmittance of a material used, the surface condition of a color filter and the like and, for example, it can be set in a range of 0.1 to 2.0 μm. A protect layer can be formed by preparing a coating liquid for the protect layer with the use of a resin having the light transmittance required for a transparent protect layer among the known transparent photosensitive resin, two-pack curing type transparent resin and the like, and coating the same by means of a spin coater within a range of 500 to 1500 rotation per minute.

The transparent electrode on the protect layer may be formed of tin indium oxide (ITO), zinc oxide (ZnO), tin oxide (SnO), or an alloy thereof by a common method such as the sputtering method, the vacuum deposition method, and the CVD method, and into a form of a predetermined pattern as required by etching with a photo resist or use of a jig. The thickness of the transparent electrode can be about 20 to 500 nm, preferably about 100 to 300 nm.

In a case of forming a pillar-like spacer on the transparent electrode, it can be formed by applying a coating liquid of the photo-curable resin composition by means of a spin coater, a roll coater, spraying, printing or the like, exposing the same by the ultraviolet ray radiation via a photo mask, alkaline development, and thermally curing by a clean oven. The pillar like spacer is formed, for example, at about 5 μm height. Like the case of forming the protect layer, the rotational frequency of the spin coater can be set in the range of 500 to 1500 rotation/minute.

A color filter 103 is produces in such a manner with the use of the ink-jet ink composition for a color filter of the present invention. Then a liquid crystal display panel can be obtained by forming an orientation layer on the inner surface side of this color filter, facing the same to an electrode substrate, and filling a liquid crystal in the gap part and sealing.

In the above-mentioned example, a pixel part is formed with the use of the ink composition of the present invention. According to the ink jet method using the ink-jet ink composition for a color filter of the present invention, it is possible to form not only the pixel part but also the black matrix layer, the pillar-like spacer, the protect layer or the like in a desired pattern, and the ink composition of the present invention is particularly useful in that it can form a coloring layer required to have a high minuteness and precision such as the pixel part or the black matrix layer.

(2) Second Method

A cured resin layer with an especially fine pattern can be precisely formed in such manner that: an ink layer forming area with an ink affinity larger than that of the surroundings is formed by selectively changing the wettability in a predetermined area of the substrate surface of the color filter; an ink layer is formed by making the ink composition of the present invention selectively adhere on the ink layer forming area by the ink-jet method; and the ink layer is then heated.

For example, it is possible to form a ink layer by; forming a wettability-variable layer capable of changing the wettability in the direction of enlarging the ink affinity by the function of a photo catalyst on a substrate; forming an ink layer forming area with an ink affinity larger than that of the surroundings by selectively changing the wettability in a predetermined area of the surface of the wettability-variable layer by exposure; and making the ink composition of the present invention selectively adhere on the ink layer forming area via the ink jet method.

In a case of providing such a wettability-variable layer on a substrate, it is preferable to use the ink composition prepared with the use of a solvent, as a main solvent, with a 25° or more contact angle with respect to the surface of a test piece with a 30 mN/m critical surface tension found in a Zisman plotting graph using a standard liquid specified in the wettability test defined in the JIS-K6768, and measuring the contact angle (θ) 30 seconds later from contact with liquid droplets, and a 10° or less contact angle with respect to the surface of a test piece with a 70 mN/m critical surface tension found in the same measurement method.

One example of such a second production method for a color filter will be described hereafter.

Figure 5A:
FIG. 5 is a view explaining another production method for a color filter using an ink composition according to the present invention.

First, as shown in FIG. 5A, a black matrix layer 16 is formed on one side of the transparent substrate 15 of the color filter so as to be disposed in an area to be a border part between the each pixel part. A pixel part forming area or corresponding color 18R, 18G or 18B is defined on a surface of the transparent substrate 15 by the pattern of the black matrix layer 16. As a transparent substrate 15, the same materials as those usable in the above-mentioned first method can be used, and as a black matrix layer 16, the same one as that in the first method can be provided as well.

Figure 5B:
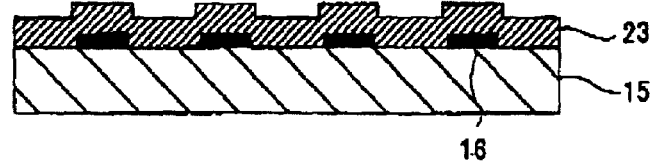

Next, as shown in FIG. 5B, a photocatalyst containing layer 23 as the wettability-variable layer is formed in an unfigured pattern (i.e., a solid pattern) in at least a part area, particularly in this example, in an area including the pixel part forming area, on a surface of the transparent substrate 15.

Figure 5C:
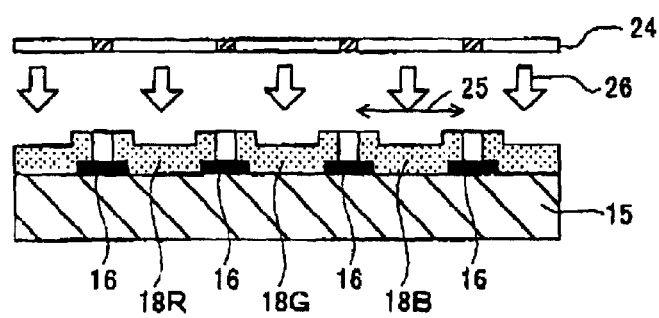

Next, as shown in FIG. 5C, the photocatalyst-containing layer 23 is exposed by irradiating with a light 26 via a photomask 24 to increase an ink affinity of the pixel part forming area 18R, 18G and 18B.

When wettability in the pixel part forming area on the wettability-variable layer such as the above-mentioned photocatalyst-containing layer 23 is selectively changed to increase an ink affinity of this area, the ink composition or the present invention easily adheres on and uniformly spreads in the pixel part forming area, and strongly repelled in and eliminated from an area surrounding the pixel part forming area to the contrary, thus forming a pixel part with a precise pattern and without color non-uniformity and color missing.

A preferable wettability-variable layer to be used for the second method is one exhibits a 20 to 50 mN/m critical surface tension found in a Zisman plotting graph using a standard liquid specified in the wettability test defined in the JIS-K6768, and measuring the contact angle ($\theta$) 30 seconds later from contact with liquid droplets before changing its wettability, while exhibiting a 40 to 80 mN/m critical surface tension found in the same measurement method after changing its wettability.

When a wettability-variable layer capable of changing a critical surface tension in such manner is used, the ink composition exhibits a very small contact angle in a pattern forming area whose ink affinity is raised by changing the wettability such as the pixel part forming area or the like, and on the other hand, it exhibits a very large contact angle in a surrounding area of the pattern forming area, thus taking a considerably great difference of the wettability.

In a case of carrying out the exposure using the photomask 24, it is preferable to take a width of an exposed portion 25 so as to be larger than that of the pixel part forming area 18 while securing a non-exposed portion at a boundary area between the pixel part forming areas adjacent to each other. Since the entire pixel part forming area 18 is sufficiently exposed in such manner and an ink affinity is raised, disadvantages such as the color missing is not caused. The photocatalyst-containing layer 23 may be exposed in a predetermined pattern, not using the photomask, but using the other method such as photolithography to scan with the laser beam. Further, when the transparent substrate is exposed from a rear side opposite to a surface provided with the photocatalyst-containing layer 23, the black matrix layer functions as the photomask, and thus the photomask is not necessary.

A light for irradiating the photocatalyst-containing layer 23 may be either a visible light or an invisible radiation insofar as activating a photocatalyst, and a light containing ultraviolet spectra is normally used. As a light source including the ultraviolet spectra, for example, mention may be made of a mercury lamp, a metal halide lamp, a xenon lamp and the like. The wavelength of the light used for this exposure can be set from a range of not greater than 400 nm, preferably not greater than 380 nm. In addition, an amount of the light to be irradiated upon exposure may be an amount of irradiation necessary for an exposed part to express the hydrophilic properties by the action of a photocatalyst.

As a wettability-variable layer capable of changing the wettability in the direction of enlarging the ink affinity, for example, not only a) one containing a photocatalyst and increasing in hydrophilic property of itself such as the photocatalyst-containing layer 23 shown in FIG. 5, but also the followings can also be exemplified:

b) One provided with a photocatalyst-containing layer beneath the wettability-variable layer (i.e., at a side facing to the transparent substrate of the wettability-variable layer) in which hydrophilic property of the wettability-variable layer is increased by function of a photocatalyst present in the photocatalyst-containing layer;

C) One provided with a decomposition type wettability-variable layer comprising a photocatalyst and a binder decomposable by function of the photocatalyst in which an exposed portion of the decomposition type wettability-variable layer is decomposed and eliminated to exposing a base surface with hydrophilic property such as a substrate surface or the like; and alternatively, D) one provided with a photocatalyst-containing layer beneath a decomposition type wettability-variable layer comprising a binder decomposable by function of the photocatalyst in which an exposed portion of the decomposition type wettability-variable layer is decomposed and eliminated by function of the photocatalyst contained in the photocatalyst-containing layer to exposing a base surface with hydrophilic property such as a surface of the photocatalyst-containing layer or the like.

"A wettability-variable layer capable of changing the wettability in the direction of enlarging the ink affinity" in the present invention means, in a lamination product composed by disposing the wettability-variable layer on a substrate, such a layer as capable of changing wettability of a surface on which the wettability-variable layer is formed in the direction of enlarging the ink affinity. It includes not only ones increasing the ink affinity of the wettability-variable layer itself such as the above examples a) and b), but also ones decomposing the wettability-variable layer to exposing a base surface with the ink affinity such as the above examples c) and d).

The above-mentioned types a) and b) will be described in detail hereafter.

a) A type in which a photocatalyst-containing layer increases its own ink affinity.

A photocatalyst-containing layer which functions as the wettability-variable layer by itself such as the photocatalyst-containing layer 23 indicated in FIG. 5 can be formed in such manner that a coating solution is prepared by dispersing and dissolving a photocatalyst and a binder in a solvent together with the other additive as required, this coating solution is then coated on a proper substrate, and thereafter the photocatalyst is firmly fixed in the binder by advancing the hydrolysis and polycondensation reaction.

As a photocatalyst, mention may be made of photo semiconductors such as titanium oxide ($TiO_2$), zinc oxide (ZnO), tin oxide ($SnO_2$), strontium titanate ($SrTiO_3$), tungten oxide ($WO_3$), bismuth oxide ($Bi_2O_3$), and iron oxide ($Fe_2O_3$). One or more may be selected from them and mixed for use.

Although the action mechanism of a photocatalyst in the photocatalyst-containing layer is not necessarily clear, it is considered that a carrier produced by the light irradiation has influences on the chemical structure of organic substances by the direct reaction with an adjacent compound or active oxygen species in the presence of oxygen and water, and such a mechanism causes, for example, oxidation, decomposition or the like of an organic group as a part of the binder or the additive, thereby increasing the hydrophilic property.

In the present invention, particularly, titanium oxide is suitably used because titanium oxide has the high band gap energy, is chemically stable and not toxic, and can be obtained easily. There are two types of titanium oxide, anatase and rutile Although both can be used in the present invention, anatase-type titanium oxide is preferable. Anatase-type titanium oxide has the excitation wavelength of not greater than 380 nm.

As such the anatase-type titanium oxide, mention may be made of hydrochloric acid-defloccuated-type anatase-type titania sol (STS-02 (average particle size 7 nm) in the trade name produced by Ishihara Sangyo Corp., ST-K01 in the trade name produced by Ishihara Sangyo Corp.), and nitric acid-defloccuated-type anatase-type titania sol (TA-15 (average particle size 12 nm) in the trade name produced by Nissan Chemical Industries, Corp.).

The small particle size of a photocatalyst is preferable because the photocatalystic reaction occurs effectively. The average particle size of 50 nm or less is preferable and it is particularly preferable to use a photocatalyst having the average particle size of not greater than 20 nm. As the particle size of a photocatalyst is smaller, the surface roughness of a photocatalyst-containing layer becomes smaller, being preferable. When the particle size of a photocatalyst exceeds 100 nm, the central line average surface roughness becomes larger, the ink-repellent properties of an unexposed part of a photocatalyst-containing layer are reduced and manifestation of the ink affinities of an exposed part becomes insufficient, being not preferable.

It is preferable that a binder used in a photocatalyst-containing layer of this type has such a high binding energy that the principal chain is not degraded by the photoexcitation of the aforementioned photocatalyst, for example, mention may be made of (1) organopolysiloxane which exerts the great strength and which is obtained by hydrolyzing and polymerization-condensing chloro or alkoxysilane through a sol-gel reaction or the like, and (2) organopolysiloxane obtained by cross-linking reactive silicone having the excellent water-repellency and oil-repellency.

In the case of the aforementioned (1), a preferable organopolysiloxane is one obtained by hydrolyzing and condensing or co-hydrolyzing and condensing one or more of silicon compounds represented by the below-mentioned formula 12:

$$Y_n SiX_{(4-n)} \qquad \text{Formula 12}$$

wherein Y denotes hydrogen atom or a hydrocarbon group which may contain a substituent, plural number of Y in one molecule may be the same as or different from each other, and n is an integer from 0 (zero) to 3.

It is preferable that the silicon compound represented by the formula 12 has at least one hydrocarbon group, as Y, which may contain a substituent.

In the formula 12, as a hydrocarbon group with no substituent or a hydrocarbon part of a substituted hydrocarbon group, there may be exemplified: straight or branched chain aliphatic hydrocarbon groups such as methyl, ethyl, the other alkyl or the like; alicyclic hydrocarbon groups such as cyclohexyl or the like; unsaturated hydrocarbon groups such as vinyl or the like; and, aromatic hydrocarbon groups such as phenyl or the like. Preferable carbon number of these hydrocarbon groups or hydrocarbon parts is in a range of 1 to 20.

Further in the formula 12, as a hydrocarbon group which may contain a substituent, there may be exemplified; fluorine containing hydrocarbon groups such as fluoroalkyl; epoxy containing hydrocarbon groups such as glycidoxyalkyl, β-(3,4-epoxycyclohexyl) alkyl or the like; acryloiloxy or methacryloiloxy containing hydrocarbon groups such as (metha) acryloiloxyalkyl; amino containing hydrocarbon groups such as aminoalkyl; mercapto containing hydrocarbon groups such as mercaptoalkyl; N-fluoroalkyl sulfonamide containing hydrocarbon groups such as N-fluoroalkyl sulfonylaminoalkyl; or fluoroalkyl containing hydrocarbon groups other than the N-fluoroalkyl sulfonamide containing hydrocarbon groups.

In addition, it is preferable that an alkoxyl group denoted as X is methoxy, ethoxy, propoxy or butoxy.

More particularly, there can be used
methyltrichlorosilane, methyltribromosilane, methyltrimethoxysilane, methyltriethoxysilane, methyltriisopropoxysilane, methyltri-t-butoxysilane;
ethyltrichlorosilane, ethyltribromosilane, ethyltrimethoxysilane, ethyltriethoxysilane, ethyltriisopropoxysilane, ethyltri-t-butoxysilane;
n-propyltrichlorosilane, n-propyltribromosilane, n-propyltrimethoxysilane, n-propyltriethoxysilane, n-propyltriisopropoxysilane, n-propyltri-t-butoxysilane;
n-hexyltrichlorosilane, n-hexyltribromosilane, n-hexyltrimethoxysilane, n-hexyltriethoxysilane, n-hexyltriisopropoxysilane, n-hexyltri-t-butoxysilane;
n-decyltrichlorosilane, n-decyltribromosilane, n-decyltrimethoxysilane, n-decyltriethoxysilane, n-decyltriisopropoxysilane, n-decyltri-t-butoxysilane;
n-octadecyltrichlorosilane, n-octadecyltribromosilane, n-octadecyltrimethoxysilane, n-octadecyltriethoxysilane, n-octadecyltriisopropoxysilane, n-octadecyltri-t-butoxysilane;
phenyltrichlorosilane, phenyltribromosilane, phenyltrimethoxysilane, phenyltriethoxysilane, phenyltriisopropoxysilane, phenyltri-t-butoxysilane, tetrachlorosilane, tetrabromosilane, tetramethoxysilane, tertaethoxysilane, tetrabutoxysilane, dimethoxydiethoxysilane;
dimethyldichlorosilane, dimethyldibromosiane, dimethyldimethoxysilane, dimethyldiethoxysilane;
diphenyldichlorosilane, diphenyldibromosilane, diphenyldimethoxysilane, diphenyldiethoxysilane;
phenylmethyldichlorosilane, phenylmethyldibromosilane, phenylmethyldimethoxysilane, phenylmethyidiethoxysilane;
trichlorhydrosilane, tribromhydrosilane, trimethoxyhyrosilane, triethoxyhydrosilane, triisopropoxyhydrosilane, tri-t-butoxyhydrosilane;
vinyltrichlorosilane, vinyltribromosilane, vinyltrimethoxysilane, vinyltriethoxysilane, vinyltriisopropoxysilane, vinyltri-t-butoxysilane;
trifluoropropyltrichlorosilane, trifluoropropyltribromosilane, trifluoropropyltrimethoxysilane, trifluoropropyltriethoxysilane, trifluoropropyltriisopropoxysiane, trifluoropropyltri-t-butoxysilane;
γ-glycidoxypropylmethyldimethoxysilane, γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyltri-t-butoxysilane;
γ-methacryloyloxypropylmethyldimethoxysilane, γ-methacryloyloxypropylmethyldiethoxysilane, γ-methacryloyloxypropyltrimethoxysilane, γ-methacryloyloxypropyltriethoxysilane, γ-methacryloyloxypropyltriisopropoxysilane, γ-methacryloyloxypropyltri-t-butoxysilane;
γ-aminopropylmethyldimethoxysilane, γ-aminopropylmethyldiethoxysilane, γ-aminopropyltrimethoxysilane, γ-aminopropyltriethoxysilane, γ-aminopropyltriisopropoxysilane, γ-aminopropyltri-t-butoxysilane;
γ-mercaptopropylmethyldimethoxysilane, γ-mercaptopropylmethyldiethoxysilane, γ-mercaptopropyltrimethoxysilane, γ-mereaptopropyltriethoxysilane, γ-mercaptopropyltriisopropoxysilane, γ-mercaptopropyltxi-t-butoxysilane;

β-(3,4-epoxycyclohexyl)ethyltrimethoxysilane, β-(3,4-epoxycyclohexyl)ethyltriethoxysilane;

and partial hydrolysate thereof; and mixture thereof.

In addition, as the organopolysiloxane compound, one containing a fluoroalkyl group is particularly preferable When the wettability-variable layer is formed with the use of the organopolysiloxane compound containing a fluoroalkyl group, an ink-repellent property and a water-repellent property of the non-exposed portion are raised by function of the fluoroalkyl group, thereby taking a great difference of the wettability to the ink between the exposed portion having got highly hydrophilic and the non-exposed portion being highly water-repellent.

Specifically, there may be used a hydrolyzed and condensed compound and cohydrolyzed and condensed compound of the silicon compound represented by the above-mentioned formula 12: $YnSiX_{(4-n)}$, as a condensation unit, wherein all or at least a part of the condensation units are one or more kinds of fluoroalkyl group containing silicon compounds such as the below-mentioned fluoroalkylsilanes. The below-mentioned fluoroalkylsilanes are generally known as a fluorine-contained silane coupling agent.

$CF_3(CF_2)_3CH_2CH_2Si(OCH_3)_3$;
$CF_3(CF_2)_5CH_2CH_2Si(OCH_3)_3$;
$CF_3(CF_2)_7CH_2CH_2Si(OCH_3)_3$;
$CF_3(CF_2)_9CH_2CH_2Si(OCH_3)_3$;
$(CF_3)_2CF(CF_2)_4CH_2CH_2Si(OCH_3)_3$;
$(CF_3)_2CF(CF_2)_6CH_2CH_2Si(OCH_3)_3$;
$(CF_3)_2CF(CF_2)_8CH_2CH_2Si(OCH_3)_3$;
$CF_3(C_6H_4)C_2H_4Si(OCH_3)_3$;
$CF_3(CF_2)_3(C_6H_4)C_2H_4Si(OCH_3)_3$;
$CF_3(CF_2)_5(C_6H_4)C_2H_4Si(OCH_3)_3$;
$CF_3(CF_2)_7(C_6H_4)C_2H_4Si(OCH_3)_3$;
$CF_3(CF_2)_3CH_2CH_2SiCH_3(OCH_3)_2$;
$CF_3(CF_2)_5CH_2CH_2SiCH_3(OCH_3)_2$;
$CF_3(CF_2)_7CH_2CH_2SiCH_3(OCH_3)_2$;
$CF_3(CF_2)_9CH_2CH_2SiCH_3(OCH_3)_2$;
$(CF_3)_2CF(CF_2)_4CH_2CH_2SiCH_3(OCH_3)_2$;
$(CF_3)_2CF(CF_2)_6CH_2CH_2SiCH_3(OCH_3)_2$;
$(CF_3)_2CF(CF_2)_8CH_2CH_2SiCH_3(OCH_3)_2$;
$CF_3(C_5H_4)C_2H_4SiCH_3(OCH_3)_2$;
$CF_3(CF_2)_3(C_6H_4)C_2H_4SiCH_3(OCH_3)_2$;
$CF_3(CF_2)_5(C_6H_4)C_2H_4SiCH_3(OCH_3)_2$;
$CF_3(CF_2)_7(C_6H_4)C_2H_4SiCH_3(OCH_3)_2$;
$CF_3(CF_2)_3CH_2CH_2Si(OCH_2CH_3)_3$;
$CF_3(CF_2)_5CH_2CH_2Si(OCH_2CH_3)_3$;
$CF_3(CF_2)_7CH_2CH_2Si(OCH_2CH_3)_3$;
$CF_3(CF_2)_9CH_2CH_2Si(OCH_2CH_3)_3$; and,
$CF_3(CF_2)_7SO_2N(C_2H_5)C_2H_4CH_2Si(OCH_3)_3$.

By using polysiloxane containing aforementioned fluoroalkyl group is used as a binder, an ink-repellent property before changing the wettability of the photocatalyst-containing layer is made large, thereby taking a great difference between a wettability before changed and the same after changed.

In addition, as a reactive silicone of the aforementioned (2), mention may be made of compounds having a chemical structure represented by the following formula 13:

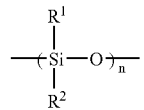

Formula 13 wherein n is an integer of not smaller than 2, $R^1$ and $R^2$ are each substituted or unsubstituted alkyl, alkenyl, aryl or cyanoalkyl group hating 1-10 carbon numbers, respectively, and not greater than 40% of the whole in moles is vinyl, phenyl or halogenated phenyl. In addition, the compounds wherein $R^1$ and are methyl group are preferable because the surface energy becomes the smallest. An amount of not smaller than 60% in terms of a mole rate of methyl group is preferable. In addition, a molecular chain has at least one reactive group such as hydroxy group at an end of a chain and a side chain.

In addition, a stable organosilicon compound which does not perform a cross-linking reaction such as dimethylpolysiloxane may be mixed into a binder together with the aforementioned organopolysilicon.

A photocatalyst-containing layer may contain a surfactant besides the aforementioned photocatalyst and binder. More specifically, mention may be made of a hydrocarbon nonionic surfactant such as NIKKOL BL, BC, BO, BB series in the trade name produced by Nikko Chemicals Corp., and a fluorine-contained or silicone-contained nonionic surfactant such as ZONYL FSN, FSO in the trade name produced by Dupont Corp., Surfron S-141 and 145 in the trade name produced by Asahi Glass Corp., Megafack F-141 and 144 in the trade name produced by Dainippon Ink & Chemicals Corp., Ftagent F-200 and F251 in the trade name produced by Neos Corp., Unidyne DS-401 and 402 in the trade name produced by Daikin Industries, Corp., Florad FC-170 and 176 in the trade name produced by 3M Corp. Alternatively, cationic surfactant, anionic surfactant and amphoteric surfactant may be used.

In addition, a photocatalyst-containing layer may contain an oligomer and a polymer such as polyvinylalcohol, unsaturated polyester, acrylic resin, polyethylene, diallyl phthalate, ethylene propylene diene monomer, epoxy resin, phenol resin, polyurethane, melamine resin, polycarbonate, polyvinyl chloride, polyamide, polyimide, styrene butadiene rubber, chloroprene rubber, polypropylene, polybutylene, polystyrene, polyvinyl acetate, polyester, polybutadiene, polybenzimidazole, polyacrylnitrile, epichlorhydrin, polysulfide, polyisoprene, and the like in addition to the aforementioned surfactants.

The content of a photocatalyst in a photocatalyst-containing layer can be set in a range of 5 to 60% by weight, preferably 20 to 40% by weight. In addition, the thickness of a photocatalyst-containing layer is preferably in a range of 0.05 to 10 μm.

As a solvent for dissolving or dispersing the above-mentioned ingredients, an alcoholic organic solvent such as ethanol, isopropanol and the like is preferable. Applying can be performed by the known applying method such as spin coating, spray coating, dip coating, roll coating, bead coating or the like. When an ultraviolet-curing type substance is contained as a binder, a photocatalyst-containing layer can be formed by performing the curing treatment by the ultraviolet ray irradiation.

b) A type in which a wettability-variable layer is provided beneath a photocatalyst containing layer and hydrophilic property of the wettability-variable layer is increased.

A wettability-variable layer of this type is formed in such manner that, first a coating liquid in which a binder and a photocatalyst are dissolved or dispersed is coated on a transparent substrate of the color filter, and thereafter the hydrolysis and polycondensation reaction is advanced to form a photocatalyst containing layer, alternatively a photocatalyst containing layer made of a simple substance is formed, and next, a wettability-variable layer is formed from a hydrophobic organic material into a thin layer on the photocatalyst containing layer. As materials such as the photocatalyst, the binder, the solvent or the like, the same materials as those usable for the above-mentioned type a) can be used.

For formation of a thin layer made of an organic material, various methods including, for example, a coating process of a solution, a surface-grafting treatment, a surfactant treatment, a layer formation method in a gaseous phase such as PVD, CVD or the like can be adapted. As an organic material, one changeable its wettability or decomposable itself can be used among low molecular compounds, high molecular compounds, surfactants or the like. More specifically, there may be exemplified a silane compound capable of changing its organic group to a hydroxyl group by function of the photocatalyst, which includes a hydrolyzed and condensed compound and co-hydrolyzed and condensed compound of one or more of silicon coupling agents, chlorosilane, alkoxylsilane or the like. A wettability-variable layer made of the above-mentioned organopolysiloxane may be formed on the photocatalyst-containing layer, and an organopolysiloxane containing a fluoroalkyl group is preferably used in such a case.

The wettability-variable layer exemplified above may be one containing a photocatalyst which is therefore a photocatalyst-containing layer by itself, or accompanied with a separate photocatalyst-containing layer disposed on a side facing to a transparent substrate of the wettability-variable layer. When this wettability-variable layer is irradiated with a light, the photocatalyst is activated, and then the wettability-variable layer changes wettability in the direction of enlarging the ink affinity by function of the activated photocatalyst. That is, either of the exemplified wettability-variable layers changes wettability of an exposed surface in the direction of enlarging the ink affinity by irradiating with a light.

In the present invention, however the wettability-variable layer is not limited to any specific kind insofar as the layer can change wettability of its surface by applying stimulation such as a chemical or mechanical stimulation from the outside. For example, the wettability-variable layer may be a layer which can change a state of a surface roughness by acid, alkali or the like to cause changing of the wettability, or alternatively it may be a layer which can convert a material contained therein into the other material by irradiation of an ultraviolet light, a visible light or a energy radiation such as heat ray or the like to cause changing of the wettability.

Though the photocatalyst-containing layer in the exemplified method is used in such manner that a pixel part forming area is irradiated with a light to increase an ink affinity, and an ink composition is made to selectively adhere thereto, it is also possible to make the ink composition selectively adhere only to a desired area in such manner that a wettability-variable layer which is capable of decreasing the ink affinity by any stimulation is provided on a transparent substrate of a color filter, and the stimulation is applied to this wettability-variable layer in a negative pattern corresponding to a pixel part forming area (i.e., a pattern reverse to a pixel part forming area) to change the wettability.

Next, an ink for forming a pixel part which is fallen into the ink-jet ink composition for a color filter of the present invention and contains one or more kinds of pigments is taken. Then, the ink for forming a pixel part of each color is selectively applied by the ink let method onto the pixel part forming area 18R, 18g and 18B which has enhanced in the ink affinity in the above-mentioned process of FIG. 5C so as to accord an applying color with a desired position among the divided areas 18R, 18g and 18B, thereby forming an ink layer 20R, 20G and 20G as shown in FIG. 5D.

Figure 5D:
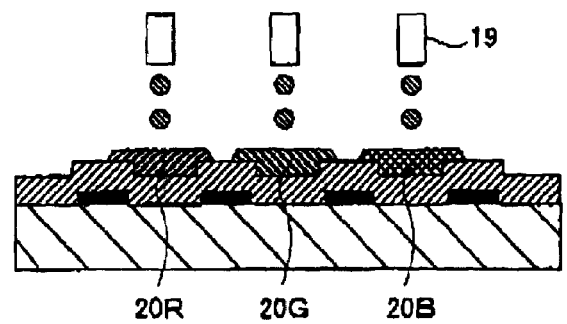
Figure 5E:
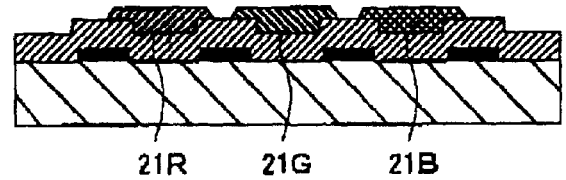
Figure 5F:
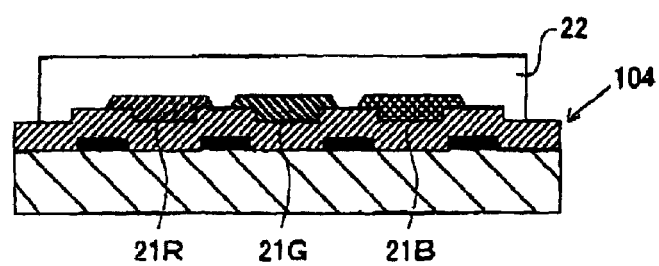

Next, as shown in FIGS. 5D and 5E, the ink layer of each color 20R, 20G and 20B is solidified by drying, and thereafter cured by heating to form a pixel part of each color 21R, 21G and 21B. Next, as shown in FIG. 5E, a protect layer 22 is formed on a side on which the pixel part 21R, 21G and 21B is formed of the transparent substrate. Thereafter a transparent electrode layer and a pillar-like spacer are further formed on the protect layer 22 though not shown in FIG. 5F, thus producing a color filter 104. In the second method, processes of curing, forming the protect layer, forming the transparent electrode and forming the pillar-like spacer can be carried out in a manner similar to the first method.

In this example, though the pixel part is formed with the use of the ink for forming the pixel part which falls into the range of the ink-jet ink composition for a color filter of the present invention, it is also possible to form a cured resin layer other than the pixel part such as a black matrix layer, a protect layer or a pillar-like spacer in an optionally desired pattern by making the ink composition of the present invention selectively adhere only to an inkphilic region by utilizing difference in wettabiliy on a surface of the substrate.

(Physical Properties of Cured Layer)

A cured resin layer formed from the ink-jet ink composition for a color filter of the present invention is excellent in various properties which are required for detail portions of the color filter, such as transparency, hardness, or heat resistance which concerns extent of, for example, thickness reduction or discoloration due to heating. For example, it is possible to form a cured resin layer having one or more of the following extents of properties such as hardness or heat resistance on a transparent substrate with the use of the ink-jet ink composition for a color filter of the present invention.

i) Hardness:

It can exhibit 2H or more of the pencil hardness in terms of a method 8.4·1 of the pencil scratch test defined in JIS-K 5400.

ii) Heat Resistance:

After a color filter provided with a cured resin layer is left at a temperature of 250° C. for one hour, the cured resin layer can exhibit 10% or less of thickness reduction in comparison with a state before leaving it, and it can also exhibit 1 (one) or less of chrominance between a state before leaving and a state after leaving.

iii) Solvent Resistance (Chemical Resistance)

After a color filter provided with a cured resin layer is dipped in anyone of solvents selected from the group consisting of isopropyl alcohol, N-methyl pyrolidone or γ-butyrolactone at 40° C. for 1 (one) hour, the cured resin layer can exhibit 10% or less of thickness reduction in every case of dipping in any one of these solvents, wherein reduction of the layer thickness is determined by measuring thickness of the cured resin layer before and after dipping and calculating based on the measured values, iv) Hot Pure Water Resistance:

After a color filter provided with a cured resin layer is dipped in a water at 80° C. for 1 (one) hour, the cured resin layer can exhibit 6 points or more in a result of the cross-cut tape-peeling test defined in 8.5 of JIS-k 5400 (1990).

A very high crosslinking density of the cured resin layer produced in the present invention is presumed to considerably contribute to exhibiting excellent hardness, solvent resistance and hot pure water resistance of the cured resin layer.

As descried hereinbefore, since the ink-jet ink composition for a color filter of the present invention does not rapidly dried even when carrying out either an intermittent ejection or a continuous ejection, it hardly generates a rapid rise of the viscosity and a choking at a nozzle end of the recording, and hardly wetly spreads on the peripheral surface of the orifice, thereby providing the sustainability of drop mass magnitude and the straightness of drop direction. Therefore, by ejecting the ink composition of the present invention to the substrate surface according to a predetermined pattern in the ink-jet method, a cured coloring layer particularly requiring the minuteness and precision such as a pixel part and a black matrix layer can be accurately and evenly formed.

Moreover, the ink-jet ink composition for a color filter of the present invention cannot be dried rapidly at the nozzle end of the ink-jet head, while it has an appropriate drying property. Therefore, after ejection on the substrate, it can be sufficiently fitted and leveled on the substrate surface, and then dried completely in a relatively short time by air drying or a common heating method. Therefore, a fine pattern with a high uniformity or evenness can be obtained as well as it can be dried efficiently.

Still moreover, in order to obtain a coating layer with an uniform thickness or an even surface for the present invention, it is preferable to carry out the prebaking by heating the coating layer of the ink composition at 100° C. or more provided that the blocking portion does not dissociate from the carboxyl group block compound (B), while restricting the heating temperature to 160° C. by or less so as to prevent the bumping. After prebaking, the postbaking is then carried out by raising a heating temperature over a dissociation temperature of the carboxyl group block compound, thus obtaining a cured coating layer with a high uniformity or evenness.

In a case of carrying out the above-mentioned prebaking of a high temperature and the postbaking, the cracking can be prevented by the use of the ink composition containing either the main polymer (A') with 70° C. or less of Tg and/or the carboxyl group block compound (B) with the primary alkyl vinyl ether, thereby obtaining the cured coating layer with a high uniformity or evenness and no cracks.

Furthermore, when an ink layer forming area with an ink affinity higher than that of the surroundings is formed by selectively changing the wettability in a predetermined area of the substrate surface and the ink composition of the present invention is shot thereto by the ink-jet method, a certain amount of ink droplets can be provided on the accurate position, furthermore, the impacted ink droplets can be spread to the every part of the ink layer forming area without stagnation at the impacted position so that the ink droplets are swelled without moving beyond the boundary with respect to the ink repellent area which is surrounding the ink layer forming area. Therefore, a thick cured resin layer can be formed accurately, and, for example, a pixel part satisfying required color density and brightness and not having color missing can be obtained in this manner.

Particularly In the case where an ink layer forming area with an ink affinity is formed by providing a wettability-variable layer capable of changing the wettability in the direction of enlarging the ink affinity by the function of the photo catalyst on the substrate, and exposing the wettability-variable layer in a predetermined pattern, it is preferable to use an ink composition prepared with the use of, as the main solvent, a solvent with a 25° or more contact angle with respect to the surface of a test piece with a 30 mN/m critical surface tension found in a Zisman plotting graph using a standard liquid specified in the wettability test defined in the JIS-K6768, and measuring the contact angle (θ) 30 seconds later from contact with liquid droplets, and a 10° or less contact angle with respect to the surface of a test piece with a 70 mN/m critical surface tension found in the same measurement method, and thus a minute and uniform pattern can efficiently be obtained.

The ink composition and the production method for a color filter of the present invention enable to produce a color filter with high performance, and they are particularly useful in that it can accurately form a pixel part which satisfies required color density and brightness and has a large uniformity with no color missing.

Moreover the ink composition of the present invention is also excellent in stability during a long-term storage, and therefore easy in its handling.

EXAMPLE (Preparation Example A: Synthesis of Polymer (A'))

In accordance with a combination ratio indicated in Table 1, 40.7 parts by weight of Diethyleneglycolmonobutylether acetate (in other name, Butylcarbitol acetate; BCA), which is a solvent not containing a hydroxyl group, is fed into a four-neck flask provided with a thermometer, are flux condenser, a agitator and a dropping funnel, and its temperature is raised at 140° C. by heating while agitating. Subsequently 54.7 parts by weight of a mixture (a dropping material) of monomers and a polymerization initiator with a combination ratio indicated in Table 1 is dropped into the solvent from the dropping funnel at constant speed by two hours while keeping a temperature at 140° C. After the dropping operation, a temperature of the mixture is lowered at 110° C., and 4.6 parts by weight of a mixture (an additional catalyst part) of a polymerization initiator and Diethyleneglycolmonobutylether acetate (BCA) which is a solvent not containing a hydroxyl group is added therein, and it is maintained at a temperature of 110° C. by two hours to finish the reaction, thus obtaining the main polymers (A'-1) and (A'-2) having properties described in Table 1.

TABLE 1

| Preparation example | A'-1 | A'-2 |
|---|---|---|
| Composition | | |
| (1) Initially fed solvent (parts by weight) | | |
| Diethylene glycol monobutyl ether acetate (BCA) | 40.7 | 40.7 |
| (2) Dropping material (parts by weight) *1 | | |
| GMA | 28.4 | 28.4 |
| MMA *2 | 21.6 | — |
| MEA *2 | — | 21.6 |
| Per butyl 0 | 4.7 | 4.7 |
| (3) Additional catalyst part (parts by weight) | | |
| Per butyl 0 | 0.30 | 0.30 |
| Diethylene glycol monobutyl ether acetate (BCA) | 4.3 | 4.3 |
| Properties | | |
| Observation *3 | Clear and Colorless | Clear and Colorless |
| Heating residue (wt %) *4 | 56.5 | 55.7 |
| Epoxy equivalence *5 | 511.6 | 514.4 |

TABLE 1-continued

| Viscosity (Ps) *6 | 48.5 | 2.6 |
| Weight average molecular weight *7 | 3980 | 3070 |

*1 Abbreviations in Table 1 mean as follows.
GMA: Glycidyl methacrylate
MMA: Methyl methacrylate
MEA: Methoxyethyl methacrylate
Perbutyl O: t-butylperoxy 2-ethylhexanoate (in the trade name produced by NOF CORPORATION)
*2 A'-1: MMA is used. A'-2: MBA is used.
*3 Observation: An appearance by naked eyes is indicated.
*4 Heating residue: A test is carried out in accordance with "4. the heating residue" of JIS-k 5407.
*5 Epoxy equivalence: After a cycle-opening reaction of the epoxy group is carried out with the use of an excessive amount of 0.2 N hydrochloric acid of dioxane solution, un-reacted hydrochloric acid is subjected to back-titration with the use of 0.1 N KOH of ethanol solution to calculate an epoxy equivalence.
*6 It is measured by means of an E type viscometer.
*7 Weight-average molecular weight: It is a calibrated value based on polystyrene, measured by gel permeation chromatography.

(Preparation Example B: Synthesis of Carboxyl Group Block Compound (B))

In accordance with a combination ratio indicated in Table 2, a solvent, a raw material (polycarboxilic acid) and a blocking agent are fed into a four-neck flask provided with a thermometer, a reflux condenser, a agitator and a dropping funnel, and its temperature is raised at 70° C. by heating while agitating. Subsequently, its temperature is maintained at 70° C. while agitating to finish the reaction at a time when an acid value of the mixture gets to 5 or less, thus obtaining the carboxyl group block compound (B-1) having properties described in Table 2.

TABLE 2

| Preparation example | B-1 |
|---|---|
| Composition | |
| (1) Solvent (parts by weight) | |
| Cyclohexanone | 14.5 |
| (2) Raw material (parts by weight) | |
| Trimellitic acid | 31.4 |
| (3) Blocking agent (parts by weight) | |
| n-Propyl vinyl ether | 54.1 |
| Properties | |
| Acid value of Solvent (mgKOH/g) *1 | 1.3 |
| Blocking ratio (%) *2 | 99.5 |
| Solid content of Blocked acid (wt %) *3 | 70.8 |
| Acid equivalence of Solution (g/mol) *4 | 212.6 |
| Weight average molecular weight *5 | 468 |

*1 Acid value of Solvent: It is subjected to titration with the use of 0.1 N KOH of ethanol solution to calculate an acid value.
*2 Blocking ratio: It is calculated by calibrating to a solid content based on an acid value in the solution.
*3 Solid content of Blocked acid: it is measured by the gas chromatography (GC).
*4 Acid equivalence of Solution: It is measured after dissociating a blocking agent by a water-methanol solution.
*5 Weight-average molecular weight: It is a calibrated value based on polystyrene, measured by gel permeation chromatography.

Examples 1 to 5

(1) Preparation of Binder

A rotor coated with Tefron (in trade name) is put into a sample bottle, and the sample bottle is mounted on a magnetic stirrer. Into the sample bottle, the main polymer (A'-1) or (A'-2) of the above-mentioned preparation example (A), the carboxyl group block compound (B-1) of the above-mentioned preparation example (B), a multifunctional epoxy resin (C) and a halogen-free acidic catalyst (D') are introduced in accordance with a combination ratio indicated in Table 3, and dissolved by sufficiently stirring at the room temperature. Subsequently a diluting solvent for adjusting viscosity is added therein and dissolved by stirring, and thereafter a filtration is carried out, thus obtaining binder compositions (α-1) to (α-5) (Solid component: 40% by weight).

TABLE 3

| Example No. | 1 | 2 | 3 | 4 | 5 |
|---|---|---|---|---|---|
| Binder No. | α-1 | α-2 | α-3 | α-4 | α-5 |
| Composition | | | | | |
| Component (A') | | | | | |
| Kind | A'-1 | A'-1 | A'-1 | A'-1 | A'-2 |
| Parts by weight | 103.4 | 71.3 | 60.0 | 58.2 | 58.2 |
| Parts by weight of Solid component *3 | 58.4 | 40.3 | 33.9 | 32.9 | 32.9 |
| Component (B) | | | | | |
| Kind | B-1 | B-1 | B-1 | B-1 | B-1 |
| Parts by weight | 35.6 | 37.6 | 54.5 | 52.9 | 52.9 |
| Parts by weight of Solid component *3 | 24.9 | 26.3 | 38.1 | 37.0 | 37.0 |
| Component (C) *1 | | | | | |
| Kind | Ep# 828 | Ep# 828 | Ep# 828 | Ep# 157 | Ep# 157 |
| Parts by weight | 16.7 | 33.3 | 28.0 | 60.1 | 60.1 |
| Parts by weight of Solid component *3 | 16.7 | 33.3 | 28.0 | 30.1 | 30.1 |
| Component (D') *1 | | | | | |
| Kind | LC-1 | LC-1 | LC-1 | LC-1 | LC-1 |
| Parts by weight | 3.6 | 3.6 | 3.6 | 3.6 | 3.6 |
| Diluent *1 | | | | | |
| Kind | BCA | BCA | BCA | BCA | BCA |
| Parts by weight | 90.7 | 104.2 | 103.9 | 75.2 | 75.2 |
| Solubility *4 | 6.5 | 6.5 | 6.5 | 6.5 | 6.6 |
| Properties | | | | | |
| Acid/Epoxy Equivalence ratio | 0.5 | 0.5 | 0.9 | 0.9 | 0.9 |
| Viscosity (mPaS) *2 | 44.0 | 28.2 | 22.5 | 33.2 | 25.1 |

*1 Abbreviations in Table 3 mean as follows.
Ep#828: Difunctional epoxy resin (Epi Coat 828EL in trade name, produced by Japan Epoxy Resin Corp.)
Ep#157: Four functional epoxy resin (Epi Coat 157S70 in trade name, produced by Japan Epoxy Resin Corp.)
LC-1: Nofcure LC-1 in trade name (produced by NOF CORPORATION)
BCA: Diethyleneglycolmonobutylether acetate
*2 It is measured by means of a E type viscometer.
*3 It means "parts by weight" calibrated to solid component of each component.
*4 Solubility of Solvent with respect to Water: It means a dissolvable amount (parts by weight) of a solvent in 100 parts by weight of the water at 20° C.

(2) Preparation of Pigment Dispersion

A pigment and a dispersing agent are introduced into a solvent, mixed and stirred by means of a three roll mill and a bead mill, thereby obtaining a red pigment dispersion with a composition mentioned below.

<Composition of Red Pigment Dispersion>
Pigment (C.I. Pigment red 254): 5 parts by weight
Dispersing agent (Solspers 24000, produced by Avecia Corp.): 2 parts by weight
Solvent (Diethylene glycol monobutylether acetate) 38.3 parts by weight
Solvent (Propylene glycol monomethylether acetate): 4.7 parts by weight (3) Preparation of Thermosetting Type Ink-Jet Ink for Red Pixel A rotor coated with Tefron (in trade name) is put into a sample bottle, and the sample bottle is mounted on a magnetic stirrer. Into the sample bottle, the above-mentioned red pigment dispersion and the binder composition mentioned in the above Table 3 are introduced so as to adjust a combination ratio of each component according to Table 4, and dissolved by sufficiently stirring. Subsequently a diluting solvent for adjusting viscosity is added therein and dissolved by stirring, and thereafter a filteration is carried out, thus obtaining thermosetting type ink-jet inks for a red pixel 1 to 5 (Solid component: 20% by weight, and P/V ratio: 0.33).

Further a cured coating layer with 1 μm thickness was obtained by coating the each ink-jet ink on a glass substrate well washed through the spin coating, sufficiently drying the same, and thereafter carrying out a final curing at 200° C. for one hour by means of a hot plate. The thus obtained cured coating layer was evaluated with regard to pencil hardness, adhesive property, and solvent resistance (chrominance ΔEab)

<Evaluation Procedure of Stability in Elapse>

A viscosity and a particle size (a median diameter based on volume) were measured at a time immediately after preparation of the ink-jet ink, and a time after leaving at 23° C. for one month. Measurement of the viscosity was carried out through

TABLE 4

| Example No. | | 1 | 2 | 3 | 4 | 5 |
|---|---|---|---|---|---|---|
| Ink No. | | Ink 1 | Ink 2 | Ink 3 | Ink 4 | Ink 5 |
| Pigment dispersion | | Red pigment dispersion | | | | |
| Binder No. | | α-1 | α-2 | α-3 | α-4 | α-5 |
| Final Composition *1 (Composition when deciding the whole amount as 100 parts by weight) | | | | | | |
| (1) Binder component | | | | | | |
| Component (A') | Kind | A'-1 | A'-1 | A'-1 | A'-1 | A'-2 |
| | Parts by Weight | 7.43 | 5.13 | 4.32 | 4.19 | 4.33 |
| Component (B) | Kind | B-1 | B-1 | B-1 | B-1 | B-1 |
| | Parts by Weight | 3.17 | 3.35 | 4.85 | 4.71 | 4.63 |
| Component (C) | Kind | Ep#828 | Ep#828 | Ep#828 | Ep#157 | Ep#157 |
| | Parts by Weight | 2.13 | 4.24 | 3.56 | 3.83 | 3.77 |
| Component (D') | Kind | LC-1 | LC-1 | LC-1 | LC-1 | LC-1 |
| | Parts by Weight | 0.06 | 0.06 | 0.06 | 0.06 | 0.06 |
| (2) Pigment | Parts by Weight | 5.00 | 5.00 | 5.00 | 5.00 | 5.00 |
| (3) Dispersing agent | Parts by Weight | 2.00 | 2.00 | 2.00 | 2.00 | 2.00 |
| (4) Solvent | | | | | | |
| BCA | Parts by Weight | 71.16 | 71.16 | 71.16 | 71.16 | 71.16 |
| Cyclohexanone | Parts by Weight | 3.67 | 3.67 | 3.67 | 3.67 | 3.67 |
| PGMEA | Parts by Weight | 4.70 | 4.70 | 4.70 | 4.70 | 4.70 |
| Others | Parts by Weight | 0.68 | 0.68 | 0.68 | 0.68 | 0.68 |
| Total | | 100 | 100 | 100 | 100 | 100 |
| Properties evaluation | | | | | | |
| Viscosity (cps) | | | | | | |
| Initial | | 9.49 | 9.14 | 7.44 | 8.07 | 8.30 |
| After one month | | 9.49 | 9.15 | 7.44 | 8.07 | 8.30 |
| Median diameter based on volume (μm) | | | | | | |
| Initial | | 0.128 | 0.122 | 0.134 | 0.135 | 0.105 |
| After one month | | 0.133 | 0.125 | 0.131 | 0.135 | 0.117 |
| Dynamic viscosity index (cps) | | 9.49 | 9.14 | 7.44 | 8.07 | 8.30 |
| Dynamic elastic modulus (cps) | | 2.03 | 0.75 | | 0.1 or less | |
| Pencil hardness | | 2 H | 2 H | 2 H | 2 H | 2 H |
| Adhesion property (point) | | 8 | 8 | 8 | 8 | 8 |
| Solvent resistance test (Δ Eab) | | | 3 or more | | 1 or less | |
| Occurrence of crack | | | | | | |
| (1) 80° C., 3 minutes, 19950 Pa | | None | None | None | None | None |
| (2) 160° C., 3 minutes 19950 Pa | | Occur | Occur | Occur | Occur | None |

*1 It means a combination ratio provided that a total amount including a solvent is determined as 100 parts by weight. It is to be noted that a ratio of each component other than the solvent is indicated in terms of a weight calibrated to a solid component.

(4) Property Evaluation

Each of the obtained thermosetting type ink-jet inks for a red pixel 1 to 5 was evaluated with regard to stability in elapse (viscosity, particle size), dynamic viscosity index, dynamic elastic modulus, and occurrence of crack.

a vibration tube flow method by means of the Vilastic V-E system (Vilastic Sientific Corp.) with a condition of 2 Hz frequency and the Current tube, tube#1 as a used tube. Measurement of the particle size (a median diameter based on volume) was carried out by means of the Microtrac UPA model 9230 (Nikkisoh Corp.)

<Evaluation Procedure of Dynamic Viscosity Index and Dynamic Elastic Modulus>

A dynamic viscosity index and a dynamic elastic modulus were measured at a time immediately after preparation of the ink-jet ink through a vibration tube flow method by means of the above-mentioned Vilastic V-E system (Vilastic Sientific Corp.) with the same condition.

<Evaluation Procedure of Pencil Hardness>

A cured coating layer obtained using the each ink-jet ink was subjected to a method8.4·1 of the pencil scratch test defined in JIS-K 5400 (1990), and a case exhibiting a pencil hardness of 2H or more was evaluated as "Good".

<Evaluation Procedure of Adhesive Property>

A cured coating layer obtained using the each ink-jet ink was subjected to the cross-cut tape-peeling test defined in 8.5 of JIS-K 5400 (1990), and a case exhibiting a result of 6 points or more was evaluated as "Good".

<Evaluation Procedure of Solvent Resistance >

A cured coating layer obtained using the each ink-jet ink was dipped in N-methyl pyrolidone at 40° C. for one hour, and a chrominance ΔEab between a state before dipping and a state after dipping. The chrominance was determined based on an equation for chrominance Δeab which is defined by the CEA (the International Commission on Illumination) in A.D.1976. A practical measurement was carried out by means of a microspectrophotometer (OSP-SP 100, in the trade name produced by Olympus optical industries, Corp.)

<Evaluation Procedure of Crack-Occurrence>

An extent of cracking was observed after a cured coating layer obtained with the use of the each ink-jet ink was prebaked in a condition at 80° C. for 3 minutes under decompression (150 Torr (about 19950 Pa)), or the other condition at 160° C. for 3 minutes under decompression (150 Torr (about 19950 Pa)).

(5) Evaluation of Ink-Jet Ink Ejection Performance

Among the thermosetting type ink-jet inks for a red pixel, the ink 1, 2 and 3were subjected to an ejecting test in a condition of an optimal voltage for a used head and a frequency of 2 kHz.

(6) Result of Evaluation

The stability in elapse (viscosity, particle size), the dynamic viscosity index, the dynamic elastic modulus, the pencil hardness, the adhesive property, the solvent resistance (chrominance ΔEab) and the occurrence of crack of the ink-jet inks 1 to 5 are described in the Table 4 mentioned above.

Particularly in the solvent resistance test, the solvent resistance (chrominance ΔEab) was remarkably enhanced by replacing the difunctional Epi coat 828 of the multifunctional epoxy resin with the four functional Epi coat 157.

Figure 8:
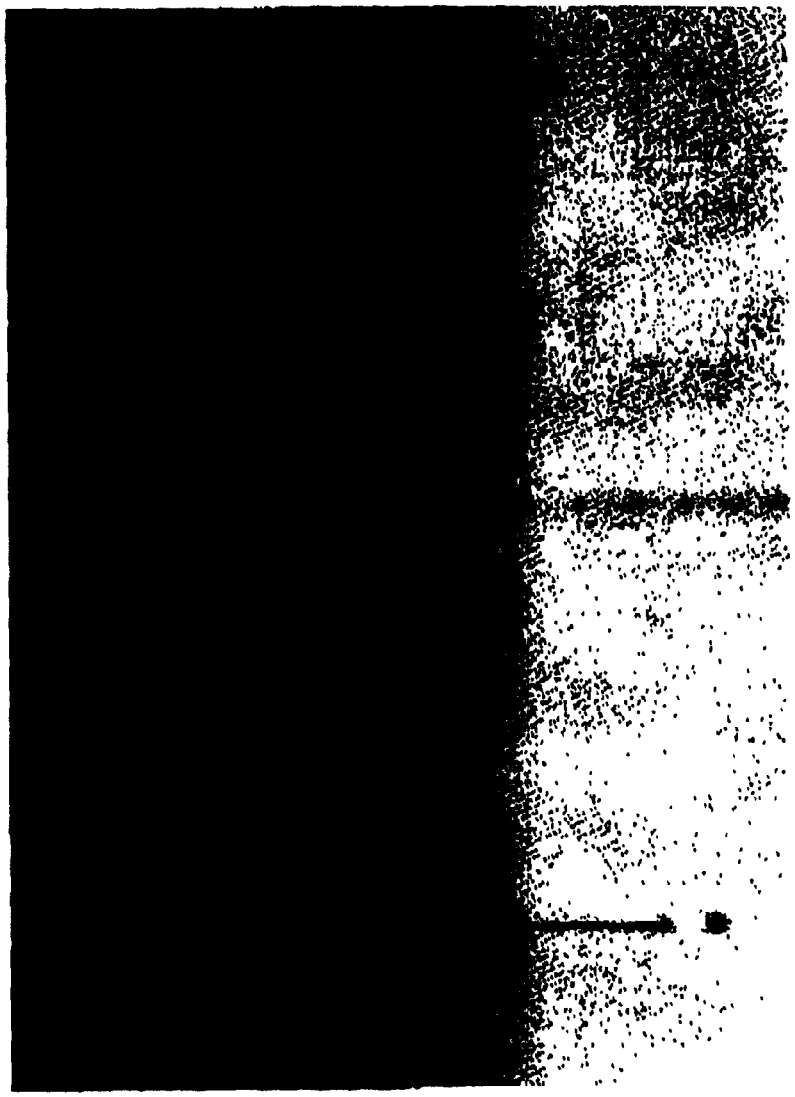
FIG. 8 is a photograph showing a state when an ink composition of Example 1 (Ink 1) is ejected by the ink-jet method; and, FIG. 9 is a photograph showing a state when an ink composition of Example 3 (Ink 3) is ejected by the ink-jet method.
Figure 9:

Every ink-jet ink 1 to 5 can be shot in the ink-jet ejecting test. Among them, the ink-jet ink 3 in which a combination ratio of the main polymer (A'-1) with a large molecular weight is low and that of the multifunctional epoxy resin (C) is relatively high is easy to divide an ejected ink droplet and stable in an ejecting status rather than the ink-jet ink 1 in which a combination ratio of the main polymer (A'-1) with a large molecular weight is high. A photograph of FIG. 8 shows a state when the ink-jet ink 1 is ejected, and a photograph of FIG. 9 shows a state when the ink-let ink 3 is ejected. A fact that the ink-jet ink 3 can be stably ejected rather than the ink-jet ink 1 proved from the both photographs.

Though the ink-jet ink 4 has a composition in which a combination ratio of the main polymer (A'-1) is further low and that of the multi functional epoxy resin (C) is further high rather than the ink-jet ink 3, it was equal to the ink-jet ink 3 in the ejection performance. However, since the ink-jet ink 4 uses a four functional epoxy resin as the epoxy resin (C) while the ink-jet ink 3 using difunctional epoxy resin (C), the ink-jet ink 4 improved in physical properties of a coating layer made from it. More specifically, among three evaluation items (i.e., pencil hardness, adhesive property, and solvent resistance) concerning the physical properties described in Table 4, a solvent resistance of the ink-jet ink 4 was superior to the ink-jet ink 3.

Regarding occurrence of the crack, the ink-j et ink 5 which contains the main polymer (A'-2) using methoxyethyl acrylate (MEA) as a copolymerizing monomer did not generate the crack of the coating layer even in a prebaking condition of a high temperature, while the other ink-jet inks 1 to 4 which contain the main polymer (A'-1) using methyl methacrylate (MMA) as a copolymerizing monomer generated the crack of the coating layer in the same prebaking condition of a high temperature.

What is claimed is:

1. An ink-jet ink composition for a color filter comprising:
(A') a main polymer wherein the main polymer is an epoxy compound (A) having two or more epoxy groups in a molecule, and has two or more glycidyl groups, comprising at least a constituent unit represented by the below-mentioned formula 2 and a constituent unit represented by the below-mentioned formula 3,

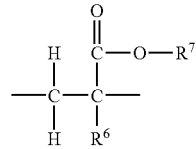

Formula 2 wherein $R^6$ denotes a hydrogen atom or an alkyl having 1 to 3 carbon atom, and $R^7$ denotes a hydrocarbon group having 1 to 12 carbons or $—(R^8X)_n—R^9$; $R^8$ denotes a substituted or unsubstituted divalent hydrocarbon group having 1 to 5 carbon atoms, X denotes an oxygen atom or a sulfur atom, and $R^9$ denotes a hydrocarbon group having 1 to 12 carbon atoms; $R^8$ and $R^9$ be bonded with each other so as to form a heterocycle having X as a hetero atom; moreover, n is an integer from 1 to 10,

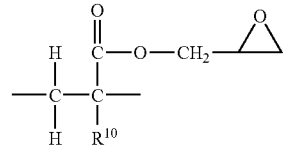

Formula 3 wherein $R^{10}$ denotes a hydrogen atom or an alkyl having 1 to 10 carbons, and wherein the weight average molecular weight of the main polymer (A') is 10,000 or less; and (B) a carboxyl group block compound having two or more functional groups represented by the below-mentioned formula 1a or formula 1b,

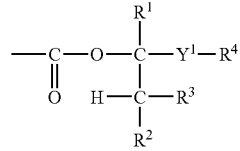

Formula 1(a)

-continued

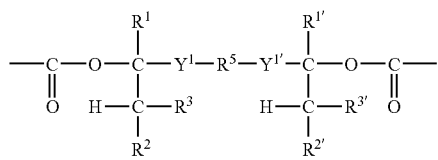

Formula 1(b)

wherein $R^1$, $R^2$, $R^3$, $R^{1'}$, $R^{2'}$ and $R^{3'}$ each denote a hydrogen atom or an organic group having 1 to 18 carbon atoms, $R^4$ and $R^5$ each denote an organic group having 1 to 18 carbon atoms, $Y^1$ and $Y^{1'}$ each denote an oxygen atom or a sulfur atom; $R^3$ and $R^4$ may be bonded with each other so as to form a heterocycle having $Y^1$ as a hetero atom; moreover, $R^{1'}$, $R^{2'}$ and $R^{3'}$ and $Y^{1'}$ may be same as or different from corresponding $R^1$, $R^2$, $R^3$ and $Y^1$, respectively; and a solvent (E) which dissolves or disperses components of the ink, and contains as a main solvent having 180° C. to 260° C. boiling point and a 133 Pa or less vapour pressure at an ordinary temperature by a 80% by weight or more ratio with respect to the total amount of the solvent (E); and said composition further comprising a pigment or other coloring agent contained therein.

2. The ink-jet ink composition for a color filter according to claim 1, wherein the main polymer (A') has $—(R^8X)_n—R^9$ as $R^7$ in the constituent unit represented by the formula 2, a divalent hydrocarbon group having 1 to 3 carbon atoms as $R^8$, an oxygen atom as X, an alkyl group having 1 to 3 carbon atoms as $R^9$, an integer from 1 to 5 as n, and a hydrogen atom or a methyl as $R^{10}$ in the constituent unit represented by the formula 3.

3. The ink-jet ink composition for a color filter according to claim 1, wherein a solvent with a 25° or more contact angle with respect to the surface of a test piece with a 30 mN/m critical surface tension found in a Zisman plotting graph using a standard liquid specified in the wettability test defined in the JIS-K6768, and measuring the contact angle (θ) 30 seconds later from contact with liquid droplets, and a 10° or less contact angle with respect to the surface of a test piece with a 70 mN/m critical surface tension found in the same measurement method, is used as the main solvent.

4. The ink-jet ink composition for a color filter according to claim 1, wherein the main solvent is a solvent not containing a hydroxyl group.

5. The ink-jet ink composition for a color filter according to claim 4, wherein the main solvent is at least one selected from the group consisting of an ethylene glycol monobutyl ether acetate, a diethylene glycol monobutyl ether acetate, a diethylene glycol monoethyl ether acetate, a diethylene glycol dibutyl ether, a diethyl adipate, a dibutyl oxalate, a dimethyl malonate, a diethyl malonate, a dimethyl succinate and a diethyl succinate.

6. The ink-jet ink composition for a color filter according to claim 5, wherein the main solvent is a diethylene glycol monobutyl ether acetate.

7. The ink-jet ink composition for a color filter according to claim 1, wherein the ink-jet ink composition further comprises a multifunctional epoxy resin (C) having two or more epoxy groups in a molecule.

8. The ink-jet ink composition for a color filter according to claim 7, wherein the ink-jet ink composition comprises 10 to 80 parts by weight of a main polymer (A') as the epoxy compound (A), 10 to 60 parts by weight of the carboxyl group block compound (B), and 10 to 60 parts by weight of the multifunctional epoxy resin (C), the epoxy compound (A) being a main polymer (A') having two or more glycidyl groups, comprising at least a constituent unit represented by the below-mentioned formula 2 and a constituent unit represented by the below-mentioned formula 3,

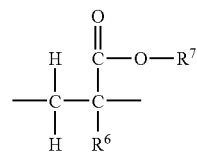

Formula 2 wherein $R^6$ denotes a hydrogen atom or an alkyl having 1 to 3 carbon atoms, and $R^7$ denotes a hydrocarbon group having 1 to 12 carbon atoms or $—(R^8X)_n—R^9$; $R^8$ denotes a substituted or unsubstituted divalent hydrocarbon group having 1 to 5 carbon atoms, X denotes an oxygen atom or a sulfur atom, and $R^9$ denotes a hydrocarbon group having 1 to 12 carbon atoms; $R^8$ and $R^9$ may be bonded with each other so as to form a heterocycle having X as a hetero atom; moreover, n is an integer from 1 to 10,

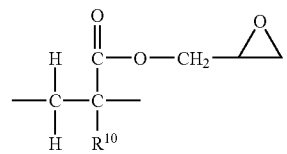

Formula 3 wherein $R^{10}$ denotes a hydrogen atom or an alkyl having 1 to 10 carbon atoms.

9. The ink-jet ink composition for a color filter according to claim 8, wherein the equivalent ratio of the functional group of the formulas 1a and 1b and the epoxy group existing in the ink-jet ink composition for a color filter (reaction equivalence of the functional group of the formulas 1a and 1b/reaction equivalence of the epoxy group) is 0.2 to 2.0.

10. The ink-jet ink composition for a color filter according to claim 8, wherein the weight average molecular weight of the main polymer (A') is 10,000 or less, and the multifunctional epoxy resin (C) is one having 4 or more epoxy groups.

11. The ink-jet ink composition for a color filter according to claim 1, wherein the carboxyl group block compound (B) is a monocyclic aromatic carboxylic acid derivative represented by the below-mentioned formula 5;

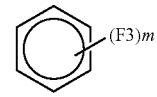

Formula 5 wherein F3 is a functional group represented by the formula 1a or 1b, and m is an integer of 2 or more.

12. The ink-jet ink composition for a color filter according to claim 11, wherein the monocyclic aromatic carboxylic acid derivative is a block derivative of trimesic acid and/or trimellitic acid.

13. The ink-jet ink composition for a color filter according to claim 1, wherein the ink-jet ink composition further comprises a thermal potential catalyst (D) to show the activity at the time of thermal curing.

14. The ink-jet ink composition for a color filter according to claim 13, wherein the thermal potential catalyst (D) is a halogen-free acidic catalyst (D').

15. A production method for an ink-jet ink composition for a color filter, comprising steps of:
preparing a pigment dispersion by mixing a pigment and as needed a pigment dispersing agent with a dispersion preparing solvent containing as a main solvent a solvent having a 180° C. to 260° C., boiling point and a 133 Pa or less vapor pressure at an ordinary temperature; and
mixing the obtained pigment dispersion, the main polymer (A') defined by claim 1, and the carboxyl group block compound (B) defined by claim 1 with the main solvent which is additionally provided so as to adjust the ratio of the main solvent in the total solvent amount to 80% by weight or more.

16. The production method for an ink-jet ink composition for a color filter according to claim 15, wherein as the main solvent, a solvent not containing a hydroxyl group is used.

17. The production method for an ink-jet ink composition for a color filter according to claim 16, wherein as the main solvent, at least one selected from the group consisting of an ethylene glycol monobutyl ether acetate, a diethylene glycol monobutyl ether acetate, a diethylene glycol monoethyl ether acetate, a diethylene glycol dibutyl ether, a diethyl adipate, a dibutyl oxalate, a dimethyl malonate, a diethyl malonate, a dimethyl succinate and a diethyl succinate is used.

18. The production method for an ink-jet ink composition for a color filter according to claim 17, wherein as the main solvent, a diethylene glycol monobutyl ether acetate is used.

19. A production method for a color filter comprising steps of:
providing an ink-jet ink composition for a color filter defined by claim 1
forming an ink layer by making the ink-jet ink composition selectively adhere on a predetermined area of a substrate by the ink-jet method; and, forming a colored cured layer by heating the ink layer.

20. The production method for a color filter according to claim 19, wherein a pixel part is formed as the colored cured layer.

21. A production method for a color filter comprising steps of:
providing an ink-jet ink composition for a color filter defined by claim 1
forming an ink layer forming area with an ink affinity larger than that of the surroundings by selectively changing wettability in a predetermined area of the substrate surface;
forming an ink layer by making the ink-jet ink composition selectively adhere on the ink layer forming area by the ink-jet method; and,
forming a colored cured layer by heating the ink layer.

22. The production method for a color filter according to claim 21, wherein a pixel part is formed as the colored cured layer.

23. A production method for a color filter comprising steps of: providing an ink-jet composition for a color filter defined by claim 3
forming a wettability-variable layer capable of changing wettability in the direction of enlarging the ink affinity by the function of a photo catalyst on a substrate;
forming an ink layer forming area with an ink affinity larger than that of the surroundings by selectively changing the wettability in a predetermined area of the surface of the wettability-variable layer by exposure,
forming an ink layer by making the ink-jet ink composition selectively adhere on the ink layer forming area by the ink-jet method; and
forming a colored cured layer by heating the ink layer.

24. The production method for a color filter according to claim 23, wherein a pixel part is formed as the colored cured layer.

* * * * *